(12) United States Patent
Chappelle et al.

(10) Patent No.: US 10,964,980 B2
(45) Date of Patent: *Mar. 30, 2021

(54) INDICATOR CIRCUIT DECOUPLED FROM A GROUND PLANE

(71) Applicant: DURACELL U.S. OPERATIONS, INC., Wilmington, DE (US)

(72) Inventors: Alistair Neil Chappelle, Cambridge (GB); Jerome Alexander Martin Dilley, Knapwell (GB); Calvin Christopher Giles, Cambridge (GB); Konstantin Dimitrov Stefanov, Cambridge (GB); Matthew Emmanual Milton Storkey, Trumpington (GB); Jordan Todorov Bourilkov, Bethany, CT (US); Sergio Coronado Hortal, Bethel, CT (US); William Fitler Morris, Newtown, CT (US); Steven Jeffrey Specht, Brookfield, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 360 days.

This patent is subject to a terminal disclaimer.

(21) Appl. No.: 15/787,413

(22) Filed: Oct. 18, 2017

(65) Prior Publication Data

US 2018/0040929 A1    Feb. 8, 2018

Related U.S. Application Data

(62) Division of application No. 14/674,110, filed on Mar. 31, 2015, now Pat. No. 9,882,250.

(Continued)

(51) Int. Cl.
*H01M 10/00* (2006.01)
*H01M 10/48* (2006.01)
(Continued)

(52) U.S. Cl.
CPC ....... *H01M 10/488* (2013.01); *H01M 10/425* (2013.01); *H02J 7/0029* (2013.01);
(Continued)

(58) Field of Classification Search
CPC ............. H01M 10/488; H01M 10/425; H01M 2010/4271; H02J 7/0047; H02J 7/0036;
(Continued)

(56) References Cited

U.S. PATENT DOCUMENTS 3,354,565 A   11/1967   Emmons et al.
3,992,228 A   11/1976   Depoix
(Continued)

FOREIGN PATENT DOCUMENTS

CN   1084281 A   3/1994
CN   1163020 A   10/1997
(Continued)

OTHER PUBLICATIONS

Atmel Corporation, *Application Note AVR400: Low Cost A/D Converter*, available at http://www.atmel.com/images/doc0942.pfd (last visited Oct. 24, 2013).
(Continued)

*Primary Examiner* — Nicholas P D'Aniello
(74) *Attorney, Agent, or Firm* — Marshall, Gerstein & Borun LLP

(57) ABSTRACT

The invention is directed towards an indicator circuit. The indicator circuit includes a ground plane; an antenna; a decoupler component; and an integrated circuit. The antenna includes at least one antenna trace; a first antenna terminal; and a second antenna terminal. The decoupler component includes a first decoupler component terminal and a second decoupler component terminal. The integrated circuit is electrically coupled to the first antenna terminal and the second antenna terminal. The integrated circuit is electri-
(Continued)

cally coupled to the first decoupler component terminal. The second decoupler component terminal is electrically connected to the ground plane.

20 Claims, 6 Drawing Sheets

Related U.S. Application Data

(60) Provisional application No. 62/005,168, filed on May 30, 2014.

(51) Int. Cl.
H01M 10/42 (2006.01)
H02J 7/00 (2006.01)

(52) U.S. Cl.
CPC .......... *H02J 7/0036* (2013.01); *H02J 7/0047* (2013.01); *H01M 10/4257* (2013.01); *H01M 2010/4271* (2013.01); *H02J 7/00302* (2020.01); *H02J 7/00304* (2020.01); *H02J 7/00306* (2020.01)

(58) Field of Classification Search
CPC ............. H02J 7/0029; H02J 2007/0098; H02J 2007/004; H02J 2007/0039; H02J 2007/0037
See application file for complete search history.

(56) References Cited

U.S. PATENT DOCUMENTS

| | | |
|---|---|---|
| 3,993,985 A | 11/1976 | Chopard et al. |
| 4,117,475 A | 9/1978 | Ebihara et al. |
| 4,149,146 A | 4/1979 | Ebihara et al. |
| 4,238,554 A | 12/1980 | Barrella |
| 4,302,751 A | 11/1981 | Nakauchi et al. |
| 4,460,870 A | 7/1984 | Finger |
| 4,482,615 A | 11/1984 | Rosansky et al. |
| 4,598,243 A | 7/1986 | Kawakami |
| 4,654,280 A | 3/1987 | Bailey |
| 4,759,765 A | 7/1988 | Van Kampen |
| 4,808,497 A | 2/1989 | Blomgren et al. |
| 4,860,185 A | 8/1989 | Brewer et al. |
| 4,952,330 A | 8/1990 | Leger et al. |
| 5,015,544 A | 5/1991 | Burroughs et al. |
| 5,032,825 A | 7/1991 | Kuznicki |
| 5,188,231 A | 2/1993 | Kivell et al. |
| 5,200,686 A | 4/1993 | Lee |
| 5,219,683 A | 6/1993 | Webber |
| 5,231,356 A | 7/1993 | Parker |
| 5,250,905 A | 10/1993 | Kuo et al. |
| 5,290,414 A | 3/1994 | Marple |
| 5,339,024 A | 8/1994 | Kuo et al. |
| 5,355,089 A | 10/1994 | Treger |
| 5,366,832 A | 11/1994 | Hayashi et al. |
| 5,389,458 A | 2/1995 | Weiss et al. |
| 5,389,470 A | 2/1995 | Parker et al. |
| 5,396,177 A | 3/1995 | Kuo et al. |
| 5,418,086 A | 5/1995 | Bailey |
| 5,424,722 A | 6/1995 | Inada et al. |
| 5,438,607 A | 8/1995 | Przygoda, Jr. et al. |
| 5,458,992 A | 10/1995 | Bailey |
| 5,458,997 A | 10/1995 | Crespi et al. |
| 5,491,038 A | 2/1996 | DePalma et al. |
| 5,494,496 A | 2/1996 | Huhndorff et al. |
| 5,514,491 A | 5/1996 | Webber |
| 5,525,439 A | 6/1996 | Huhndorff et al. |
| 5,543,246 A | 8/1996 | Treger |
| 5,569,556 A | 10/1996 | Bohmer |
| 5,587,573 A | 12/1996 | Owen et al. |
| 5,596,278 A | 1/1997 | Lin |
| 5,607,790 A | 3/1997 | Hughen et al. |
| 5,627,472 A | 5/1997 | Ofer et al. |
| 5,633,592 A | 5/1997 | Lang |
| 5,640,150 A | 6/1997 | Atwater |
| 5,654,640 A | 8/1997 | Bailey |
| 5,691,083 A | 11/1997 | Bolster |
| 5,737,114 A | 4/1998 | Bailey |
| 5,786,106 A | 7/1998 | Armani |
| 5,798,933 A | 8/1998 | Nicolai |
| 5,849,046 A | 12/1998 | Bailey |
| 5,925,479 A | 7/1999 | Wei et al. |
| 5,959,568 A | 9/1999 | Woolley |
| 5,963,012 A | 10/1999 | Garcia et al. |
| 6,014,014 A | 1/2000 | Owen et al. |
| 6,084,523 A | 7/2000 | Gelnovatch et al. |
| 6,127,062 A | 10/2000 | Sargeant et al. |
| 6,143,439 A | 11/2000 | Yoppolo et al. |
| 6,156,450 A | 12/2000 | Bailey |
| 6,169,397 B1 | 1/2001 | Steinbach et al. |
| 6,171,729 B1 | 1/2001 | Gan et al. |
| 6,208,235 B1 | 3/2001 | Trontelj |
| 6,218,054 B1 | 4/2001 | Webber |
| 6,252,377 B1 | 6/2001 | Shibutani et al. |
| 6,275,161 B1 | 8/2001 | Wan et al. |
| 6,300,004 B1 | 10/2001 | Tucholski |
| 6,407,534 B1 | 6/2002 | Mukainakano |
| 6,469,471 B1 | 10/2002 | Anbuky et al. |
| 6,483,275 B1 | 11/2002 | Nebrigic et al. |
| 6,587,250 B2 | 7/2003 | Armgarth et al. |
| 6,617,069 B1 | 9/2003 | Hopper et al. |
| 6,617,072 B2 | 9/2003 | Venkatesan et al. |
| 6,627,353 B1 | 9/2003 | Munshi |
| 6,670,073 B2 | 12/2003 | Tucholski et al. |
| RE38,518 E | 5/2004 | Tucholski |
| 6,730,136 B2 | 5/2004 | Webber |
| 6,774,685 B2 | 8/2004 | O'Toole et al. |
| 6,775,562 B1 | 8/2004 | Owens et al. |
| 6,849,360 B2 | 2/2005 | Marcie |
| 6,979,502 B1 | 12/2005 | Gartstein et al. |
| 6,990,171 B2 | 1/2006 | Toth et al. |
| 7,067,882 B2 | 6/2006 | Singh |
| 7,079,079 B2 | 7/2006 | Jo et al. |
| 7,157,185 B2 | 1/2007 | Marple |
| 7,386,404 B2 | 6/2008 | Cargonja et al. |
| 7,474,230 B2 | 1/2009 | Blom et al. |
| 7,489,431 B2 | 2/2009 | Malmstrom et al. |
| 7,511,454 B1 | 3/2009 | Legg |
| 7,561,050 B2 | 7/2009 | Bhogal et al. |
| 7,576,517 B1 | 8/2009 | Cotton et al. |
| 7,586,416 B2 | 9/2009 | Ariyoshi et al. |
| 7,598,880 B2 | 10/2009 | Powell et al. |
| 7,606,530 B1 | 10/2009 | Anderson et al. |
| 7,715,884 B2 | 5/2010 | Book et al. |
| 7,741,970 B2 | 6/2010 | Cunningham et al. |
| 7,745,046 B2 | 6/2010 | Kim et al. |
| 7,768,236 B2 | 8/2010 | Takamura et al. |
| 7,772,850 B2 | 8/2010 | Bertness |
| 7,805,263 B2 | 9/2010 | Mack |
| 7,911,182 B2 | 3/2011 | Cargonja et al. |
| 7,944,368 B2 | 5/2011 | Carter et al. |
| 8,031,054 B2 | 10/2011 | Tuttle |
| 8,106,845 B2 | 1/2012 | Savry |
| 8,119,286 B2 | 2/2012 | Issaev et al. |
| 8,131,486 B2 | 3/2012 | Leonard et al. |
| 8,344,685 B2 | 1/2013 | Bertness et al. |
| 8,368,356 B2 | 2/2013 | Nakashima et al. |
| 8,374,507 B2 | 2/2013 | Hudson et al. |
| 8,424,092 B2 | 4/2013 | Ikeuchi et al. |
| 8,427,109 B2 | 4/2013 | Melichar |
| 8,471,888 B2 | 6/2013 | George et al. |
| 8,652,670 B2 | 2/2014 | Uchida |
| 8,653,926 B2 | 2/2014 | Detcheverry et al. |
| 8,900,731 B2 | 12/2014 | Bohne |
| 8,905,317 B1 | 12/2014 | Hsu et al. |
| 9,037,426 B2 | 5/2015 | Schaefer |
| 9,060,213 B2 | 6/2015 | Jones |
| 9,076,092 B2 | 7/2015 | Ritamaki et al. |
| 9,083,063 B2 | 7/2015 | Specht et al. |
| 9,146,595 B2 | 9/2015 | Forutanpour et al. |
| 9,167,317 B2 | 10/2015 | DeMar |
| 9,189,667 B2 | 11/2015 | Bourilkov et al. |

(56) References Cited

U.S. PATENT DOCUMENTS

| | | |
|---|---|---|
| 9,235,044 B2 | 1/2016 | Specht et al. |
| 9,297,859 B2 | 3/2016 | Mukaitani et al. |
| 9,312,575 B2 | 4/2016 | Stukenberg et al. |
| 9,331,378 B2 | 5/2016 | Merlin et al. |
| 9,425,487 B2 | 8/2016 | Bertness |
| 9,453,885 B2 | 9/2016 | Mukaitani et al. |
| 9,459,323 B2 | 10/2016 | Mukaitani et al. |
| 9,461,339 B2 | 10/2016 | Roohparvar |
| 9,478,850 B2 | 10/2016 | Bourilkov et al. |
| 9,551,758 B2 | 1/2017 | Bourilkov et al. |
| 9,568,556 B2 | 2/2017 | Bourilkov et al. |
| 9,619,612 B2 | 4/2017 | Kallfelz et al. |
| 9,639,724 B2 | 5/2017 | Bourilkov et al. |
| 9,661,576 B2 | 5/2017 | Tomisawa |
| 9,699,818 B2 | 7/2017 | Grothaus et al. |
| 9,726,763 B2 | 8/2017 | Dempsey et al. |
| 9,739,837 B2 | 8/2017 | Bourilkov et al. |
| 9,746,524 B2 | 8/2017 | Petrucelli |
| 9,774,210 B1 | 9/2017 | Wright |
| 9,823,310 B2 | 11/2017 | Bourilkov et al. |
| 9,841,462 B2 | 12/2017 | Kim et al. |
| 9,843,220 B2 | 12/2017 | Herrmann et al. |
| 9,869,726 B2 | 1/2018 | Zumstein et al. |
| 9,882,250 B2 | 1/2018 | Chappelle et al. |
| 9,887,463 B2 | 2/2018 | Bourilkov et al. |
| 9,893,390 B2 | 2/2018 | Specht et al. |
| 9,983,312 B2 | 5/2018 | Dempsey et al. |
| 10,094,886 B2 | 10/2018 | Bourilkov et al. |
| 10,151,802 B2 | 12/2018 | Riemer et al. |
| 10,184,988 B2 | 1/2019 | Bourilkov et al. |
| 10,297,875 B2 | 5/2019 | Riemer et al. |
| 10,416,309 B2 | 9/2019 | Dempsey et al. |
| 10,483,634 B2 | 11/2019 | Bourilkov et al. |
| 2001/0005123 A1 | 6/2001 | Jones et al. |
| 2001/0026226 A1 | 10/2001 | Andersson et al. |
| 2002/0001745 A1 | 1/2002 | Gartstein et al. |
| 2002/0086718 A1 | 7/2002 | Bigwood et al. |
| 2003/0070283 A1 | 4/2003 | Webber |
| 2003/0169047 A1 | 9/2003 | Chen |
| 2003/0170537 A1 | 9/2003 | Randell |
| 2003/0184493 A1 | 10/2003 | Robinet et al. |
| 2003/0228518 A1 | 12/2003 | Marple |
| 2004/0029007 A1 | 2/2004 | Kusumoto et al. |
| 2004/0048512 A1 | 3/2004 | Chen |
| 2004/0183742 A1 | 9/2004 | Goff et al. |
| 2005/0038614 A1 | 2/2005 | Botts et al. |
| 2005/0073282 A1 | 4/2005 | Carrier et al. |
| 2005/0095508 A1 | 5/2005 | Yamamoto |
| 2005/0112462 A1 | 5/2005 | Marple |
| 2005/0162129 A1 | 7/2005 | Mutabdzija et al. |
| 2005/0233214 A1 | 10/2005 | Marple et al. |
| 2005/0258797 A1 | 11/2005 | Hung |
| 2005/0277023 A1 | 12/2005 | Marple et al. |
| 2006/0017581 A1 | 1/2006 | Schwendinger et al. |
| 2006/0028179 A1 | 2/2006 | Yudahira et al. |
| 2006/0043933 A1 | 3/2006 | Latinis |
| 2006/0046152 A1 | 3/2006 | Webber |
| 2006/0046153 A1 | 3/2006 | Webber |
| 2006/0046154 A1 | 3/2006 | Webber et al. |
| 2006/0047576 A1 | 3/2006 | Aaltonen et al. |
| 2006/0163692 A1 | 7/2006 | Detecheverry et al. |
| 2006/0168802 A1 | 8/2006 | Tuttle |
| 2006/0170397 A1 | 8/2006 | Srinivasan et al. |
| 2006/0208898 A1 | 9/2006 | Swanson et al. |
| 2006/0247156 A1 | 11/2006 | Vanderby et al. |
| 2006/0261960 A1 | 11/2006 | Haraguchi et al. |
| 2007/0080804 A1 | 4/2007 | Hirahara et al. |
| 2007/0096697 A1 | 5/2007 | Maireanu |
| 2007/0108946 A1 | 5/2007 | Yamauchi et al. |
| 2007/0182576 A1 | 8/2007 | Proska et al. |
| 2007/0210924 A1 | 9/2007 | Arnold et al. |
| 2007/0273329 A1 | 11/2007 | Kobuse et al. |
| 2008/0053716 A1 | 3/2008 | Scheucher |
| 2008/0076029 A1 | 3/2008 | Bowden et al. |
| 2008/0079391 A1 | 4/2008 | Schroeck et al. |
| 2008/0157924 A1 | 7/2008 | Batra |
| 2008/0160392 A1 | 7/2008 | Toya et al. |
| 2008/0206627 A1 | 8/2008 | Wright |
| 2008/0218351 A1 | 9/2008 | Corrado et al. |
| 2008/0252462 A1 | 10/2008 | Sakama |
| 2009/0008031 A1 | 1/2009 | Gould et al. |
| 2009/0009177 A1 | 1/2009 | Kim et al. |
| 2009/0024309 A1 | 1/2009 | Crucs |
| 2009/0041228 A1 | 2/2009 | Owens et al. |
| 2009/0098462 A1 | 4/2009 | Fujiwara et al. |
| 2009/0148756 A1 | 6/2009 | Specht et al. |
| 2009/0155673 A1 | 6/2009 | Northcott |
| 2009/0179763 A1 | 7/2009 | Sheng |
| 2009/0214950 A1 | 8/2009 | Bowden et al. |
| 2009/0263727 A1 | 10/2009 | Josephs et al. |
| 2009/0273473 A1 | 11/2009 | Tuttle |
| 2009/0289825 A1 | 11/2009 | Trinkle |
| 2009/0297949 A1 | 12/2009 | Berkowitz et al. |
| 2009/0308936 A1 | 12/2009 | Nitzan et al. |
| 2010/0019733 A1 | 1/2010 | Rubio |
| 2010/0030592 A1 | 2/2010 | Evans et al. |
| 2010/0073003 A1 | 3/2010 | Sakurai et al. |
| 2010/0081049 A1 | 4/2010 | Holl et al. |
| 2010/0085008 A1 | 4/2010 | Suzuki et al. |
| 2010/0087241 A1 | 4/2010 | Nguyen et al. |
| 2010/0143753 A1 | 6/2010 | Kim et al. |
| 2010/0209744 A1 | 8/2010 | Kim |
| 2010/0219252 A1 | 9/2010 | Kikuchi et al. |
| 2010/0295943 A1 | 11/2010 | Cha et al. |
| 2010/0308974 A1 | 12/2010 | Rowland et al. |
| 2011/0018777 A1 | 1/2011 | Brown |
| 2011/0023130 A1 | 1/2011 | Gudgel et al. |
| 2011/0104520 A1 | 5/2011 | Ahn |
| 2011/0123874 A1 | 5/2011 | Issaev et al. |
| 2011/0163752 A1 | 7/2011 | Janousek et al. |
| 2011/0293969 A1 | 12/2011 | Hoofman et al. |
| 2012/0021266 A1 | 1/2012 | Marple et al. |
| 2012/0056002 A1 | 3/2012 | Ritamaki et al. |
| 2012/0081774 A1 | 4/2012 | De Paiva Martins et al. |
| 2012/0086615 A1 | 4/2012 | Norair |
| 2012/0121943 A1 | 5/2012 | Roohparvar |
| 2012/0183862 A1 | 7/2012 | Gupta et al. |
| 2012/0190305 A1 | 7/2012 | Wuidart |
| 2012/0206102 A1 | 8/2012 | Okamura et al. |
| 2012/0206302 A1 | 8/2012 | Ramachandran et al. |
| 2012/0217971 A1 | 8/2012 | Deluca |
| 2012/0235870 A1 | 9/2012 | Forster |
| 2012/0277832 A1 | 11/2012 | Hussain |
| 2012/0299597 A1 | 11/2012 | Shigemizu |
| 2012/0323511 A1 | 12/2012 | Saigo et al. |
| 2013/0069768 A1 | 3/2013 | Madhyastha et al. |
| 2013/0117595 A1 | 5/2013 | Murawski et al. |
| 2013/0127611 A1 | 5/2013 | Bernstein et al. |
| 2013/0148283 A1 | 6/2013 | Forutanpour et al. |
| 2013/0154652 A1 | 6/2013 | Rice et al. |
| 2013/0161380 A1 | 6/2013 | Joyce et al. |
| 2013/0162402 A1 | 6/2013 | Amann et al. |
| 2013/0162403 A1 | 6/2013 | Striemer et al. |
| 2013/0162404 A1 | 6/2013 | Striemer et al. |
| 2013/0164567 A1 | 6/2013 | Olsson et al. |
| 2013/0171479 A1 | 7/2013 | Kim et al. |
| 2013/0183568 A1 | 7/2013 | Babinec et al. |
| 2013/0185008 A1 | 7/2013 | Itabashi et al. |
| 2013/0244062 A1* | 9/2013 | Teramoto ............ H01M 10/425 429/7 |
| 2013/0271072 A1 | 10/2013 | Lee et al. |
| 2013/0295421 A1 | 11/2013 | Teramoto et al. |
| 2013/0320989 A1 | 12/2013 | Inoue et al. |
| 2014/0062663 A1 | 3/2014 | Bourilkov et al. |
| 2014/0139380 A1 | 5/2014 | Ouyang et al. |
| 2014/0188413 A1 | 7/2014 | Bourilkov et al. |
| 2014/0197802 A1 | 7/2014 | Yamazaki |
| 2014/0229129 A1 | 8/2014 | Campbell et al. |
| 2014/0302348 A1 | 10/2014 | Specht et al. |
| 2014/0302351 A1 | 10/2014 | Specht et al. |
| 2014/0320144 A1 | 10/2014 | Nakaya |
| 2014/0342193 A1 | 11/2014 | Mull et al. |
| 2014/0346873 A1 | 11/2014 | Colangelo et al. |
| 2014/0347249 A1 | 11/2014 | Bourilkov et al. |

(56) References Cited

U.S. PATENT DOCUMENTS

| | | |
|---|---|---|
| 2014/0370344 A1 | 12/2014 | Lovelace et al. |
| 2014/0379285 A1 | 12/2014 | Dempsey et al. |
| 2015/0061603 A1 | 3/2015 | Loftus et al. |
| 2015/0064524 A1 | 3/2015 | Noh et al. |
| 2015/0162649 A1 | 6/2015 | Bae et al. |
| 2015/0349391 A1 | 12/2015 | Chappelle et al. |
| 2015/0357685 A1 | 12/2015 | Iwasawa et al. |
| 2016/0034733 A1 | 2/2016 | Bourilkov et al. |
| 2016/0049695 A1 | 2/2016 | Lim et al. |
| 2016/0064781 A1 | 3/2016 | Specht et al. |
| 2016/0092847 A1 | 3/2016 | Buchbinder |
| 2016/0137088 A1 | 5/2016 | Lim et al. |
| 2016/0154025 A1 | 6/2016 | Song et al. |
| 2016/0277879 A1 | 9/2016 | Daoura et al. |
| 2017/0040698 A1 | 2/2017 | Bourilkov et al. |
| 2017/0062841 A1 | 3/2017 | Riemer et al. |
| 2017/0062880 A1 | 3/2017 | Riemer et al. |
| 2017/0092994 A1 | 3/2017 | Canfield et al. |
| 2017/0125855 A1 | 5/2017 | Gong et al. |
| 2017/0176539 A1 | 6/2017 | Younger |
| 2017/0286918 A1 | 10/2017 | Westermann et al. |
| 2017/0301961 A1 | 10/2017 | Kim et al. |
| 2017/0315183 A1 | 11/2017 | Chao et al. |
| 2017/0331162 A1 | 11/2017 | Clarke et al. |
| 2018/0088182 A1 | 3/2018 | Bourilkov et al. |
| 2018/0120386 A1 | 5/2018 | Riemer et al. |
| 2018/0123174 A1 | 5/2018 | Riemer et al. |
| 2018/0123175 A1 | 5/2018 | Riemer et al. |
| 2018/0123176 A1 | 5/2018 | Riemer et al. |
| 2018/0123233 A1 | 5/2018 | Bourilkov et al. |
| 2018/0159225 A1 | 6/2018 | Bourilkov et al. |
| 2019/0113579 A1 | 4/2019 | Riemer et al. |
| 2019/0137572 A1 | 5/2019 | Bourilkov et al. |
| 2020/0011997 A1 | 1/2020 | Dempsey et al. |

FOREIGN PATENT DOCUMENTS

| | | |
|---|---|---|
| CN | 1228540 A | 9/1999 |
| CN | 1315072 A | 9/2001 |
| CN | 1529182 A | 9/2004 |
| CN | 2828963 Y | 10/2006 |
| CN | 101126795 A | 2/2008 |
| CN | 201142022 Y | 10/2008 |
| CN | 201233435 Y | 5/2009 |
| CN | 101702792 A | 5/2010 |
| CN | 101785164 A | 7/2010 |
| CN | 102097844 A | 6/2011 |
| CN | 102142186 A | 8/2011 |
| CN | 102544709 A | 7/2012 |
| CN | 202308203 U | 7/2012 |
| CN | 202720320 U | 2/2013 |
| CN | 202856390 U | 4/2013 |
| CN | 103682482 A | 3/2014 |
| CN | 104635169 A | 5/2015 |
| CN | 105337367 A | 2/2016 |
| CN | 205160145 U | 4/2016 |
| CN | 106405241 A | 2/2017 |
| CN | 106848448 A | 6/2017 |
| CN | 107284272 A | 10/2017 |
| CN | 206804833 U | 12/2017 |
| DE | 10118027 A1 | 11/2002 |
| DE | 10118051 A1 | 11/2002 |
| EP | 0523901 A1 | 1/1993 |
| EP | 1450174 A1 | 8/2004 |
| EP | 1693807 A1 | 8/2006 |
| EP | 1786057 A2 | 5/2007 |
| EP | 1821363 A1 | 8/2007 |
| EP | 2065962 A1 | 6/2009 |
| EP | 2204873 A1 | 7/2010 |
| EP | 2324535 A1 | 5/2011 |
| EP | 2328223 A1 | 6/2011 |
| EP | 2645447 A1 | 10/2013 |
| EP | 2680093 A2 | 1/2014 |
| EP | 2790262 A1 | 10/2014 |
| EP | 3128599 A1 | 2/2017 |
| JP | S52005581 A | 1/1977 |
| JP | 61169781 | 7/1986 |
| JP | 02142324 | 5/1990 |
| JP | H03131771 A | 6/1991 |
| JP | H06284170 A | 10/1994 |
| JP | H09005366 A | 1/1997 |
| JP | 10014003 | 1/1998 |
| JP | 2000077928 A | 3/2000 |
| JP | 2001022905 A | 1/2001 |
| JP | 2004085580 A | 3/2004 |
| JP | 2004-253858 A | 9/2004 |
| JP | 2004534430 A | 11/2004 |
| JP | 2005327099 A | 11/2005 |
| JP | 2006139544 A | 6/2006 |
| JP | 2006284431 A | 10/2006 |
| JP | 2006324074 A | 11/2006 |
| JP | 2007515848 A | 6/2007 |
| JP | 2007171045 A | 7/2007 |
| JP | 2008042985 A | 2/2008 |
| JP | 2008-530682 A | 8/2008 |
| JP | 2008181855 A | 8/2008 |
| JP | 2009-37374 | 2/2009 |
| JP | 2010-092760 A | 4/2010 |
| JP | 2010098361 A | 4/2010 |
| JP | 2010-154012 A | 7/2010 |
| JP | 2011113759 A | 6/2011 |
| JP | 2011203595 A | 10/2011 |
| JP | 2012/0056002 A | 3/2012 |
| JP | 2012085491 A | 4/2012 |
| JP | 2012-124141 A | 6/2012 |
| JP | 2012-129183 A | 7/2012 |
| JP | 2012161614 A | 8/2012 |
| JP | 2012170262 A | 9/2012 |
| JP | 2013-038967 A | 2/2013 |
| JP | 2013038961 A | 2/2013 |
| JP | 2013120640 A | 6/2013 |
| JP | 2016-518006 A | 6/2016 |
| KR | 2011-0018488 A | 2/2011 |
| TW | M510009 U | 10/2015 |
| TW | I580153 B | 4/2017 |
| WO | WO-95/01062 A1 | 1/1995 |
| WO | WO-03/047064 A2 | 6/2003 |
| WO | WO-2004/047215 A1 | 6/2004 |
| WO | WO-2004/107251 A2 | 12/2004 |
| WO | WO-2005/078673 A1 | 8/2005 |
| WO | WO-2006/048838 A1 | 5/2006 |
| WO | WO-2006/085291 A2 | 8/2006 |
| WO | WO-2008/151181 A1 | 12/2008 |
| WO | WO-2008/156735 A1 | 12/2008 |
| WO | WO-2010/127509 A1 | 11/2010 |
| WO | WO-2011/063679 A1 | 6/2011 |
| WO | WO-2011/096863 A1 | 8/2011 |
| WO | WO-2012/051272 A2 | 4/2012 |
| WO | WO-2012/061262 A1 | 5/2012 |
| WO | WO-2012/070635 A1 | 5/2012 |
| WO | WO-2012/083759 A1 | 6/2012 |
| WO | WO-2013/022857 A2 | 2/2013 |
| WO | WO-2013/024341 A1 | 2/2013 |
| WO | WO-2013/069423 A1 | 5/2013 |
| WO | WO-2013/084481 A1 | 6/2013 |
| WO | WO-2013/101652 A1 | 7/2013 |
| WO | WO-2015/183609 A1 | 12/2015 |
| WO | WO-2016/146006 A1 | 9/2016 |
| WO | WO-2016/166735 A1 | 10/2016 |
| WO | WO-2016/172542 A1 | 10/2016 |

OTHER PUBLICATIONS

Kooser, Tethercell magically turns AA batteries into Bluetooth devices, CNET.com, downloaded from the Internet at: <https://www.cnet.com/news/tethercell-magically-turns-aa-batteries-into-bluetooth-devices/> (Jan. 8, 2013).

Tethercell Smart Battery Adapter fundraising campaign on Indiegogo website (<https://www.indiegogo.com/projects/tethercell-smart-battery-adapter#/>) (launched Oct. 2013).

Tethercell video uploaded at <https://vimeo.com/53823785> (Oct. 2012).

(56) References Cited

OTHER PUBLICATIONS

Yamashiro, Voltage Detecting Circuit, Japanese Patent No. 52005581, Hitashi Ltd., (Jan. 17, 1977), Translated by the United States Patent and Trademark Office via Phoenix Translations (Elgin, TX) in Feb. 2018.
Japanese Patent Application No. 2017/515681, Decision of Grant, dated Jun. 28, 2019.
European Patent Application No. 15728682.4, Communication Pursuant to Article 94(3) EPC, dated Aug. 13, 2018.
Chinese Patent Application No. 201580028499.X, Office Action and Search Report, dated Aug. 29, 2018.
PCT International Search Report with Written Opinion in corresponding international application PCT/US2015/031335 dated Jul. 30, 2015.
International Preliminary Report on Patentability, International Application No. PCT/US2015/031335, dated Dec. 6, 2016.
Japanese Patent Application No. 2019-132998, Notification of Reason for Rejection, dated Sep. 29, 2020.

\* cited by examiner

INDICATOR CIRCUIT DECOUPLED FROM A GROUND PLANE

CROSS-REFERENCE TO RELATED APPLICATIONS

This application is a divisional of U.S. Ser. No. 14/674,110, filed Mar. 31, 2015, which claims benefit of U.S. Provisional Application No. 62/005,168, filed May 30, 2014, the entire disclosures of which are incorporated herein by reference.

FIELD OF THE INVENTION

The invention relates to an indicator circuit decoupled from a ground plane and, more specifically, relates to an indicator circuit decoupled from a battery.

BACKGROUND OF THE INVENTION

Wireless communications, including radio frequency identification (RFID) and other near field communication (NFC) protocols, are gaining in popularity for applications such as security, inventory management, access control, and the like. The number of smart phones that include RFID or NFC protocols is growing along with the various applications of passive or active transponders, such as RFID indicator circuits and NFC indicator circuits. Such indicator circuits include an antenna that modulates, and in some instances emits, a wireless communication signal that can be read by a reader, such as a smartphone. A parasitic capacitance, however, may form between the antenna and a ground plane. Parasitic capacitance, for example, may be particularly problematic when the antenna is placed on or near metal. The parasitic capacitance may reduce the antenna voltage of the antenna within the indicator circuit. As a result, the read range of the antenna may be reduced. In addition, the parasitic capacitance may detune the antenna from the antenna's specified frequency, such as 13.56 MHz. The antenna may need to be re-tuned and the re-tuning could be impracticable in certain situations.

Electrochemical cells, or batteries, are commonly used as electrical energy sources. A battery contains a negative electrode, typically called the anode, and a positive electrode, typically called the cathode. The anode contains an active material that can be oxidized. The cathode contains an active material that can be reduced. The anode active material is capable of reducing the cathode active material. A separator is disposed between the anode and cathode. An electrolyte is also included within the battery. The aforementioned components are generally disposed in a metal can.

Battery testers may be used to determine characteristics of a battery, such as the remaining battery capacity. An exemplary type of a common battery tester that is placed onbatteries is known as a thermochromic-type tester. In a thermochromic battery tester, a circuit may be completed when a consumer manually depressing one or two button switches. Once the switch is depressed, the consumer has connected the battery to the thermochromic tester. The thermochromic tester may include a silver resistor, e.g., a flat silver layer that has a variable width so that the electrical resistance also varies along its length. As current travels through the silver resistor, the dissipated power generates heat that changes the color of a thermochromic ink display that is placed over the silver resistor. The thermochromic ink display may be arranged as a gauge to indicate the relative capacity of the battery. However, it is typically necessary for the consumer to inconveniently hold the battery and/or remove the battery from the device in order to test the battery using the battery tester.

Accordingly, there exists a need for an indicator circuit for wireless communication, for example RFID and/or NFC applications, that is decoupled from a ground plane. A communications system including such an indicator circuit may reduce or eliminate shorting between the antenna and the ground plane. In addition, the communications system including such an indicator circuit may eliminate any need to re-tune the antenna. In addition, the communications system including such an indicator circuit may reduce or eliminate interference from other metal parts that may function as the ground plane. An indicator circuit for wireless communications that is decoupled from a ground plane may also be incorporated within a battery tester. Any parasitic capacitance that may form as a result of the metal housing of the battery or other metal components, such as those within the device, may be reduced or eliminated. In either instance, the read range of the antenna within the indicator circuit may not be adversely affected by the ground plane/metal components when the antenna is near the ground plane/metal components.

SUMMARY OF THE INVENTION

In one embodiment, the invention is directed towards an indicator circuit. The indicator circuit includes a ground plane; an antenna; a decoupler component; and an integrated circuit. The antenna includes at least one antenna trace; a first antenna terminal; and a second antenna terminal. The decoupler component includes a first decoupler component terminal and a second component terminal. The integrated circuit is electrically coupled to the first antenna terminal and the second antenna terminal. The integrated circuit is electrically coupled to the first decoupler component terminal. The second decoupler component terminal is electrically connected to the ground plane.

In another embodiment, the invention is directed towards an indicator circuit. The indicator circuit includes a battery; an antenna; a decoupler component; and an integrated circuit. The battery includes a positive terminal and a negative terminal. The antenna includes at least one antenna trace; a first antenna terminal; and a second antenna terminal. The decoupler component includes a first decoupler component terminal and a second decoupler component terminal. The integrated circuit is electrically coupled to the first antenna terminal and the second antenna terminal. The integrated circuit is electrically coupled to the positive terminal of the battery. The integrated circuit is electrically coupled to the first decoupler component terminal. The second decoupler component terminal is electrically connected to the negative terminal of the battery.

In another embodiment, the invention is directed towards an indicator circuit. The indicator circuit includes a battery; an antenna; a decoupler component; and an integrated circuit. The battery includes a positive terminal and a negative terminal. The antenna includes at least one antenna trace; a first antenna terminal; and a second antenna terminal. The decoupler component includes a first decoupler component terminal and a second decoupler component terminal. The integrated circuit is electrically coupled to the first antenna terminal and the second antenna terminal. The integrated circuit is electrically coupled to the negative terminal of the battery. The integrated circuit is electrically coupled to the first decoupler component terminal. The second decoupler component terminal is electrically connected to the positive terminal of the battery.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

DETAILED DESCRIPTION OF THE INVENTION

Figure 1:
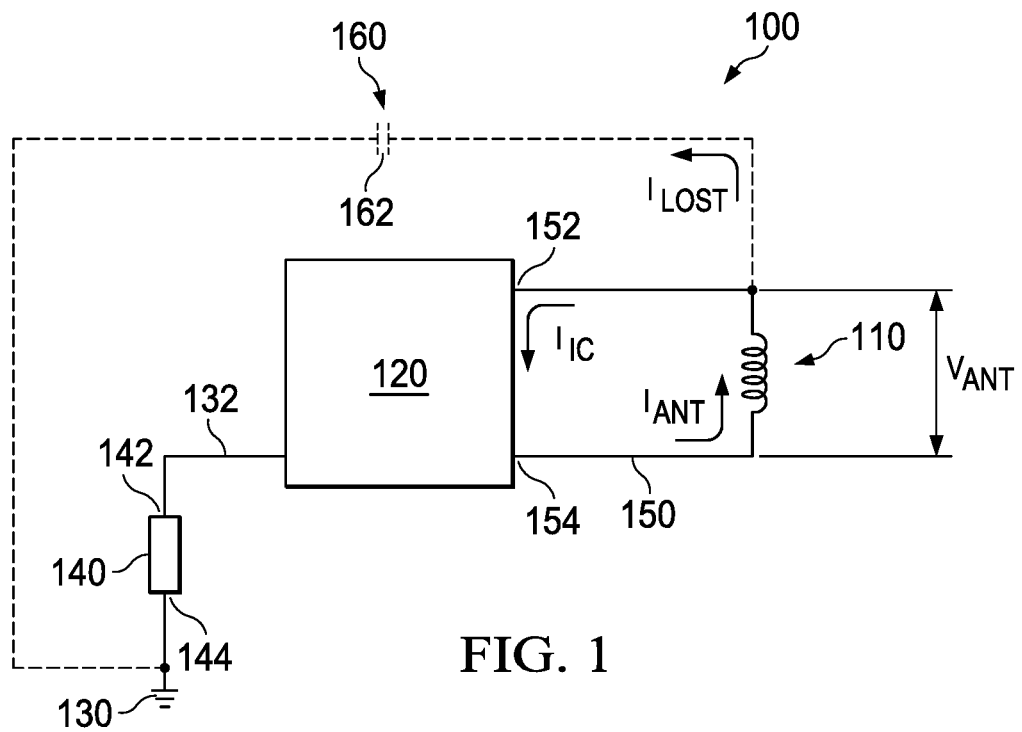
FIG. 1 is a schematic of an indicator circuit decoupled from a ground plane according to one or more embodiments shown and described herein.

The present invention is directed towards an indicator circuit that is decoupled from a ground plane. The indicator circuit is capable of sending and/or receiving a wireless communication signal. The indicator circuit includes an integrated circuit, an antenna, and a decoupler component. The indicator circuit may be electrically coupled to a device, such as a battery, and the indicator circuit may wirelessly communicate characteristics, such as battery voltage, to a reader, such as a smartphone. In some embodiments, the ground plane may be, for example, a metal housing of the battery.

The integrated circuit (IC) may include a circuit of transistors, resistors, diodes, inductors, and/or capacitors constructed on a single substrate, such as a semiconductor wafer or chip, or a metal, polymer, or ceramic substrate, in which the discreet components are interconnected to perform a given function. The IC may comprise a communications circuit and/or an analog-to-digital converter (ADC) electrically coupled together to perform a function, or any number of functions. The IC may be electrically connected to a system ground in order for the IC to perform its function(s). The IC may include other circuits to include, but not be limited to, an indication circuit, a power circuit, a RFID circuit or block, a NFC circuit or block, an input/output circuit or port, etc. The IC may physically co-locate the communications circuit and ADC together side-by-side or physically integrate them together. The IC may also comprise an application specific integrated circuit (ASIC) that is specifically manufactured to encompass the performance of the function, or any number of functions, that are required. The function may be to determine a specified condition of an article and relay that information to the reader in the form of function information. The function may also be to signally communicate a notification of the specific condition of the article or the function may be to provide an indication of the specified condition of the article which may include audible, visible, or pallesthesia indications. Pallesthesia is the ability to sense a vibration and a pallesthesia indication is a mechanical or electromechanical means to provide the sense of vibration. The IC may be of any suitable shape. The IC may have a rectangular or square shape with a length, width, and height. The IC may be active, semi-active, battery-assisted passive, or may be passive. The IC may have a width of less than about 3 mm, for example between about 0.5 mm and about 2 mm. The IC may have a height of less than about 1.0 mm, for example between about 0.02 mm and about 0.10 mm. The IC may have a length of less than about 3 mm, for example between about 1.0 mm to about 2.0 mm.

The communications circuit may be any suitable communications circuitry such as radio-frequency identification (RFID) circuitry and near field communication (NFC) circuitry as included within, for example, ISO/IEC 14443 (proximity cards), 15693 (vicinity cards), 15961, 15962, 15963, and 18000 communication standards; Bluetooth circuitry as included within, for example, IEEE 802.15.1 communication standard; WiFi circuitry as included within, for example, IEEE 802.11 communication standard; Zigbee circuitry as included within, for example, IEEE 802 communication standard; and any suitable fixed wireless communication circuitry. The communications circuit may utilize any suitable frequency bands such as low-frequency (from about 125 kHz to about 134.2 kHz and from about 140 kHz to about 148.5 kHz); high frequency (HF) (13.56 MHz); ultra-high frequency (UHF) (860-956 MHz); or microwave frequency (2.4-5.8 GHz). In addition, other communications circuitry may be used, such as audible or inaudible sound or visible light.

The antenna may include at least one antenna trace that may define a single antenna; multiple antennas; or define one or more continuous loop antennas. Each loop may have one or more turns or windings of the at least one antenna trace. The at least one antenna trace may include a first antenna terminal and a second antenna terminal. The first antenna terminal and the second antenna terminal may provide joint connections for solder, conductive adhesive, ultrasonic welding, themosonic bonding, thermo-compression bonding, or crimping of the integrated circuit (IC). The first antenna terminal and the second antenna terminal may be electrically coupled to the IC.

The antenna may include any number of loops required to achieve the desired read range. The corresponding IC input capacitance and antenna inductance must be accounted for in deciding how many symmetrical loops and/or how many turns per symmetrical loop may be used to provide a LC (inductance and capacitance) tank circuit with a tunability range to meet the communications circuit and reader resonance frequencies.

The at least one antenna trace, the first antenna terminal, and the second antenna terminal may be made from copper, aluminum, silver, gold, or other conductive metals. Other examples include conductive polymers, conductive glues, and conductive carbon, such as graphite. The at least one antenna trace, the first antenna terminal, and the second antenna terminal may be printed or painted. The at least one antenna trace of the antenna may be printed by a machine that defines the antenna through the use of screen, gravure, or ink jet printing to apply the material onto a subject surface. The printing may be completed via RF sputtering techniques; impact or pressure techniques that define material on the subject surface; metal foil mask techniques; and etch techniques, or heat or light activation techniques that activate the material that is applied to the subject surface.

The at least one antenna trace, the first antenna terminal, and the second antenna terminal may be made from foil. The at least one antenna trace, the first antenna terminal, and the second antenna terminal may be a pre-formed wire that is either insulated or bare. If the pre-formed wire is bare, it may be covered by a non-conductive sheet, a non-conductive tape, a non-conductive flexible substrate, or a non-conductive shrink wrap.

The ground plane may be an electrically conductive surface that is connected to system ground. The ground plane may be, for example, metal. The ground plane may be, for example, metal components or componentry that are included within a device.

A parasitic capacitance may form when the antenna is in proximity to the ground plane. The parasitic capacitance may be a distributed capacitance between the antenna and the ground plane. The parasitic capacitance may affect any antenna including, for example, a single-ended antenna and a differential-type, or floating-type, antenna. The parasitic capacitance may reduce the desired read range of the antenna. The parasitic capacitance may electronically function as a capacitor and may have a capacitive value. The capacitive value of the parasitic capacitance will vary depending upon the area of overlap of the antenna with the ground plane. The capacitive value of the parasitic capacitance will also vary depending upon the distance between the antenna and the ground plane as well as the dielectric medium between the antenna and the ground plane. The dielectric medium may be an electrical insulator, such as ferrite, plastic, air, and the like. The capacitive value of the parasitic capacitance may be calculated according to Equation 1:

$$C = \varepsilon_r \varepsilon_0 \frac{A}{d} \quad \text{(Equation 1)}$$

where C is the capacitive value of the parasitic capacitance, in Farads (F); $\varepsilon_r$ is the relative static permittivity, or the dielectric constant, of the dielectric medium between the antenna and the ground plane (for a vacuum, $\varepsilon_r=1$); $\varepsilon_0$ is the vacuum permittivity, which is approximately $8.854\times10^{-12}$ F m$^{-1}$; A is the area of overlap of the antenna and the ground plane, in square meters (m$^2$); and d is the distance of separation between the antenna and the ground plane, in meters (m). For example, the dielectric material between the antenna and the ground plane may be ferrite with a dielectric constant of 1; the surface area of the antenna trace may be 335 mm$^2$; and the distance between the antenna and the ground plane may be 0.1 mm. Using Equation 1, the capacitive value of the parasitic capacitance under these conditions is calculated to be about $29.7\times10^{-12}$ F [(1) (0.000335 m$^2$)($8.854\times10^{-12}$ F m$^{-1}$)/(0.0001 m)].

The reactance of the antenna and the parasitic capacitance may act as a voltage divider within the indicator circuit. The voltage divider will reduce the antenna voltage of the antenna and the associated read range of the antenna. The decoupler component may be selected to minimize the reduction of the voltage of the antenna by the voltage divider. The decoupler component decouples the parasitic capacitance from the antenna and reduces or eliminates any interference from the ground plane with the antenna. The decoupler component may be any component that provides the necessary decoupling of the antenna from the ground plane. The decoupler component may be a resistor, an inductor, and any combination thereof. The decoupler component may be, for example, a discrete surface mount component. The decoupler component may be a printed component, such as printed carbon. The decoupler component may be a resistive material, such as resistive glue. The system ground and the ground plane are not directly connected when the decoupler component is included within the indicator circuit.

The decoupler component may be, for example, a resistor having a resistance that is selected to minimize reduction of the antenna voltage within the indicator circuit by the ground plane. The resistance of the resistor may be, for example, at least about 10 times the reactance of the parasitic capacitance at the operating frequency of the indicator circuit. The resistor may have a resistance, for example, of greater than about 100 Ohms (Ω). The resistor may have a resistance, for example, of greater than about 200Ω. The resistor may have a resistance, for example, of greater than about 1,000Ω. The resistor may have a resistance, for example, of greater than about 10,000Ω. The resistor may have a resistance, for example, of greater than about 20,000Ω.

The decoupler component may be, for example, an inductor having an inductance that is selected to minimize reduction of the antenna voltage within the indicator circuit by the ground plane. The inductor may have an inductance, for example, of greater than about 50 microHenry (μH). The inductor may have an inductance, for example, of greater than about 100 μH. The inductor may have an inductance, for example, of greater than about 150 μH.

The selection of the decoupler component may be determined in accordance with the example calculations that follow. The antenna will have an inductance that is maximized in order for the antenna to remain tunable when taking into consideration the input capacitance of the communications circuit. The reactance of the antenna may be calculated according to Equation 2:

$$Z_L = 2\pi f L \quad \text{(Equation 2)}$$

where $Z_L$ is the reactance of the antenna, in Ohms (Ω); f is the frequency of the antenna voltage, in Hertz (Hz); and L is the inductance of the antenna, in Henry (H). For example, an antenna for a high frequency RFID, or NFC, communications circuit at 13.56 MHz may have an inductance of about $5\times10^{-6}$H where the antenna is referenced to the system ground. Using Equation 2, the reactance of the antenna for the exemplary RFID indicator circuit is calculated to be about 426Ω (2·π·13.56×10⁶ Hz·5×10⁻⁶H).

The exemplary parasitic capacitance that is calculated by Equation 1 above may also have a reactance. The reactance of the parasitic capacitance may be calculated according to Equation 3:

$$Z_c = \frac{1}{2\pi f C} \quad \text{(Equation 3)}$$

where $Z_C$ is the reactance of the parasitic capacitance, in Ohms (Ω); f is the frequency of the antenna voltage, in Hertz (Hz); and C is the capacitive value of the parasitic capacitance, as is calculated by Equation 1, in Farads (F). Using Equation 3, the reactance of the parasitic capacitance is calculated to be about 390Ω [1/(2·π·13.56×10⁶ Hz·29.7×10⁻¹² F)].

The current that is available to the antenna within the indicator circuit will be split, according to Kirchhoff's Law, between the current that is pulled by the integrated circuit and the current that is lost to the parasitic capacitance. This relationship is mathematically expressed according to Equation 4:

$$I_{ANT} = I_{IC} + I_{LOST} \quad \text{(Equation 4)}$$

where $I_{ANT}$ is the antenna current, in Amperes (A); $I_{IC}$ is the input current of the integrated circuit, in Amperes (A); and $I_{LOST}$ is the current lost to the parasitic capacitance, in Amperes (A).

The particular integrated circuit within the indicator circuit will have a minimum operating current. The particular integrated circuit will also have a minimum voltage, or threshold voltage, at which the integrated circuit is able to turn on. The minimum operating current may be determined, according to Ohm's Law, for the particular integrated circuit since the threshold voltage of, and the resistance within, the particular integrated circuit are known. For example, the threshold voltage of, and the resistance within, the particular integrated circuit may be 1 volt (V) and 1000Ω respectively. The minimum operating current, $_{IIC}$, of the integrated circuit according to Ohm's Law is 0.001 A [1 V/1000Ω].

The antenna will need to produce enough current to offset any lost current that is associated with the parasitic capacitance in order to keep the threshold voltage constant. The current lost to the parasitic capacitance, $_{ILOST}$, may be calculated using Ohm's Law and the reactance of the parasitic capacitance, as is calculated by Equation 3. The current lost to the parasitic capacitance, according to Ohm's Law, is 0.00256 A [1 V/390Ω] at the constant threshold voltage.

The antenna current, according to Equation 4, is 0.00356 A [0.001 A+0.00256 A]. The antenna will have to generate 1 V and compensate for the losses across the antenna reactance according to Equation 5:

$$V_{ANT} = V_{IC} + (I_{ANT} \cdot Z_{ANT}) \quad \text{(Equation 5)}$$

where $V_{ANT}$ is the antenna voltage, in volts (V); $V_{IC}$ is the threshold voltage of the integrated circuit, in volts (V); $I_{ANT}$ is the antenna current, in Amperes (A); and $Z_{ANT}$ is the reactance of the antenna, as is calculated by Equation 2, in Ohms (Ω). The antenna voltage, as is calculated according to Equation 5, is 2.517 V [1 V+(0.00356 A×426Ω)], which will result in a reduced read range of the indicator circuit.

The decoupler component is added between the system ground and the ground plane. The resulting equivalent circuit of the indicator circuit would have the decoupler component in series with the parasitic capacitance. The current lost to the parasitic capacitance, $_{ILOST}$, is now mathematically represented according to Equation 6:

$$I_{LOST} = \frac{V_{IC}}{Z_C + Z_D} \quad \text{(Equation 6)}$$

where $V_{IC}$ is the threshold voltage of the integrated circuit, in volts (V); $Z_C$ is the reactance of the parasitic capacitance, as is calculated by Equation 3, in Ohms (Ω); and $Z_D$ is the reactance of the decoupler component, in Ohms (Ω). The reactance of the decoupler component should be large in relation to the reactance of the parasitic capacitance so as to minimize any negative affect of the parasitic capacitance on the antenna within the indicator circuit.

The antenna voltage of the indicator circuit may be, for example, more than about 95% of the antenna voltage for an indicator circuit that is not affected by the parasitic capacitance. In this instance, the current lost to the parasitic capacitance should be less than 5% of the input current of the integrated circuit. Equation 6, under these conditions, may be written as follows:

$$0.05(0.001A) = \frac{1V}{Z_C + Z_D}$$

Solving for $Z_C + Z_D$ results in a total reactance within the indicator circuit at about 5% voltage reduction that is 20,000Ω. The reactance of the parasitic capacitance, $Z_C$, is calculated above as 390Ω. The resulting impedance of the decoupler component, $Z_D$, for the exemplary indicator circuit is 19,610Ω (20,000Ω−390Ω). Thus, the inclusion of a decoupler component, such as a resistor with a resistance of about 20,000Ω, will result in less than about 5% antenna voltage loss. The resistor, for example, decouples the parasitic capacitance from the antenna and reduces or eliminates any interference from the ground plane with the antenna.

The decoupler component, as is described above, may be an inductor. The inductance of the inductor may be calculated according to Equation 7:

$$L = \frac{Z_L}{2\pi f} \quad \text{(Equation 7)}$$

where L is the inductance of the inductor, in Henry (H); f is the frequency of the antenna voltage, in Hertz (Hz); and $Z_L$ is the resistance of the decoupler component, e.g., the inductor, in Ohms (Ω). Using Equation 7, the calculated inductance of the inductor is about 0.00023 H [19,610Ω/(2·π·13.56×10⁶ Hz)]. Thus, the inclusion of a decoupler component, such as an inductor with an inductance of about 0.00023 H, will result in less than about 5% antenna voltage loss. The use of an inductor as a decoupler component may be most applicable for communications circuits with antennae having high frequencies, such as UHF and microwave communications circuits.

In addition, the impedance of the decoupler component, such as the resistor or the inductor, may not exceed a resistance value that is determined by the desired accuracy of the voltage measurement by the ADC within the indicator circuit. The maximum value of the impedance of the decoupler component will vary depending upon the input resistance of the ADC chosen for the particular indicator circuit and the desired accuracy of the voltage measurement of the ADC.

The decoupler component may include a first decoupler component terminal and a second decoupler component terminal. The first decoupler component terminal may be electrically coupled to the IC. The second decoupler component terminal may be electrically coupled to the ground plane. For example, a conducting trace, such as a lead, may couple the first decoupler component terminal of the decoupler component to the IC. Similarly, a conducting trace, such as a lead, may couple the second decoupler component terminal of the decoupler component to the ground plane. The conducting traces can be formed from any suitable material that is electrically conductive, such as conductive polymers, conductive glues, conductive carbon, such as graphite, and conductive metals, such as aluminum, nickel, silver, copper, gold, and tin. The conducting traces may take any suitable form that provides electrical coupling from the first decoupler terminal of the decoupler component to the IC and from the second decoupler terminal of the decoupler component to the ground plane. The conducting traces, for example, may be printed directly on the subject surface; may be a thin metal wire affixed to the subject surface; or may be a thin insulated wire attached to the subject surface. The conductive trace may also function, in part, as the decoupler component. For example, the resistance of the conductive trace, or a section of the conductive trace, may be tailored to the required resistance of the decoupler component. For example, the conductive trace, such as conductive glue or carbon, may have a resistance of about 20,000Ω throughout the entire, or within a section, of the conductive trace.

The reader may be any device capable of reading the RFID indicator circuit or NFC indicator circuit. Specific examples of the reader include a smartphone, tablet, personal computer (PC) with NFC adapter, dedicated RFID indicator circuit reader, a dedicated NFC indicator circuit reader, a handheld computing device, or a wand antenna electrically coupled to a computing device. The reader may be used to excite the IC by transmitting an interrogation signal or may transmit a "wake-up" signal to the IC. The interrogation signal may be a RF pulse of a predetermined frequency used to energize the circuit in the IC and provide power to the IC to transmit its function information. The "wake-up" signal may be a RF pulse, but the IC may use power from another source to power the IC and to transmit its function information. The reader may include a display to visibly present the function information or an audible device capable of audibly presenting the function information. The reader may also include algorithms to interpret and/or modify the function information before presenting.

An on-cell remote indication system may include the indicator circuit that is electrically 5 coupled to an electrochemical cell, or a battery. The on-cell remote indication system may provide information about the battery to, for example, a consumer through the use of the reader. The battery may include a metal housing. The metal housing may act as the ground plane. The indicator circuit may be decoupled from the ground plane. The antenna voltage of the antenna within an indicator circuit that is decoupled from the ground plane within an on-cell remote 10 indication system may not be adversely affected by the parasitic capacitance that may form between the antenna and the battery/ground plane.

The electrochemical cell is a device that is capable of converting chemical energy within the active materials of the electrochemical cell by means of an electrochemical reduction-oxidation (redox) reaction. David Linden, *Handbook of Batteries,* 1.3 ($4^{th}$ ed. 2011). The electrochemical cell consists of an anode, a cathode, and an electrolyte. Id. One or more electrochemical cells may be referred to as a battery. Electrochemical cells, or batteries, may be primary or secondary. Primary batteries are meant to be discharged, e.g., to exhaustion, only once and then discarded. Primary batteries are described, for example, in David Linden, Handbook of Batteries (4th ed. 2011). Secondary batteries are intended to be recharged. Secondary batteries may be discharged and recharged many times, e.g., more than fifty times, a hundred times, or more. Secondary batteries are described, for example, in David Linden, Handbook of Batteries (4th ed. 2011). Accordingly, batteries may include various electrochemical couples and electrolyte combinations. It should be appreciated that the invention applies to both primary and secondary batteries of aqueous, nonaqueous, ionic liquid, and solid state systems. Primary and secondary batteries of the aforementioned systems are thus within the scope of this application and the invention is not limited to any particular embodiment.

Batteries also come in varying sizes and dimensions. The International Electrotechnical Commission (IEC), for example, has established standard sizes and dimensions for batteries available to consumers at retail. The IEC has set standard sizes and dimensions, for example, cylindrical batteries, such as AAA batteries, AA batteries, C batteries, and D batteries. Similarly, standard sizes and dimensions have been set for non-cylindrical batteries. A 9V alkaline battery, for example, has a prismatic, or rectangular, shape. Individual battery or device manufacturers may also designate the dimensions for prismatic batteries that may not be generally available at retail, such as lithium ion prismatic batteries. It should be appreciated that the present invention applies to batteries of various sizes, such as cylindrical and prismatic, and dimensions, such as AA, AAA, C, D, and 9V as well as batteries sizes and dimensions designated by individual battery or device manufacturers.

The battery may have a positive terminal and a negative terminal. The IC may be electrically coupled, in series, parallel, or a combination thereof, to the positive terminal and the negative terminal of the battery. For example, a conducting trace, such as a lead, may connect the negative terminal of the battery to the IC. Similarly, a conducting trace, such as a lead, may connect the positive terminal of the battery to the IC. The conducting traces can be formed from any suitable material that is electrically conductive, such as conductive polymers; conductive glues; conductive carbon, such as graphite; and conductive metals, such as aluminum, nickel, silver, copper, gold, and tin. The conducting traces may be printed directly on the battery; may be a thin metal wire affixed to the battery; may be a thin insulated wire attached to the battery; or any other suitable form that provides electrical connection from the positive terminal to the IC and from the negative terminal to the IC. The conducting traces may be electrically isolated from the housing of the battery. For example, the conducting trace may extend from the IC to the negative terminal of the battery and remain electrically isolated from the battery till it is electrically coupled to the negative terminal of the battery. Similarly, the conducting trace may extend from the IC to the positive terminal of the battery and remain electrically isolated from the battery till it is electrically coupled to the positive terminal of the battery. The conducting traces may be coupled to the positive terminal and the negative terminal of the battery, for example, by a conductive adhesive, such as a silver epoxy, by ultrasonic welding, by resistance welding, by laser welding, or by mechanical pressure.

The IC of the indicator circuit may perform any number of a series of functions with respect to the battery. The IC may provide information regarding: power output of the battery; rate of discharge of the battery; when the battery is nearing the end of its useful life; and state of charge of the battery. The IC may also provide: over-discharge protection; over-charge protection; remaining capacity determination; voltage determination; cycle life determination; and power management. Power management functions may include battery identification; battery state of health; battery protection; cell balancing; fuel gauging; charge control; voltage conversion; load regulation; powering the battery on/off; power setting adjustment; allow or prevent recharging; battery by-pass; temperature monitoring; and charging rate adjustment. The IC may be used, for example, in an on-cell remote indication system to provide information about the battery to, for example, a consumer through the use of the reader. The IC may also be configured with a unique identifier, such as an RFID indicator circuit equivalent, that indicates either a unique sequence of numbers/symbols or information such as, for example, manufacturing date, lot number, serial number, and the other identifiable information.

The indicator circuit for the on-cell remote indication system may also include an antenna, as is described above, that includes at least one antenna trace, a first antenna terminal, and a second antenna terminal. The IC, for example, may physically integrate and electrically couple together the communications circuit, such as the RFID indicator circuit and/or the NFC indicator circuit, the ADC, the first antenna terminal, and the second antenna terminal.

The IC may, for example, be configured to sense a voltage of the battery with a first lead electrically coupled to the negative terminal of the battery and a second lead electrically coupled to positive terminal of the battery. The IC may sense the voltage between the negative terminal of the battery and the positive terminal of the battery and signally report that voltage to a reader.

The metal housing of the battery may act as the ground plane. In addition, multiple batteries may be included within an electronic device. The metal housing of a battery that is near a battery including an on-cell remote indication system may act as the ground plane. In addition, the electronic device may include metal components, such as terminals, circuitry, and the like, that may act as the ground plane. A parasitic capacitance may form when the antenna is in proximity to the metal housing of the battery, the metal housing of another battery, and/or other metal components within the electronic device. The parasitic capacitance may reduce the antenna voltage of the antenna within the on-cell remote indication system. The decoupler component being electrically coupled with the IC and, for example, the positive terminal of the battery, decouples the parasitic capacitance from the antenna and reduces or eliminates any interference from the ground plane with the antenna. The antenna voltage of the antenna within an indicator circuit that is decoupled from the ground plane within an on-cell remote indication system may not be adversely affected by the parasitic capacitance that may form between the antenna and the battery/ground plane.

The on-cell remote indication system may also include a magnetic diverter if the housing of the battery to which the on-cell remote indication system is attached is metal. The magnetic diverter may be any material with high magnetic permeability at a specified frequency and with low electrical conductivity. The magnetic diverter may be, for example, a thin, flexible, ferrite material adjacent to and covering the housing. Other materials may be used as the ferrite shield which provide a high magnetic permeability such as, for example, iron, nickel, or cobalt and their corresponding alloys. Other materials for the ferrite shield also include oxides which are not substantially electrically conductive. The magnetic diverter may be a film affixed to the surface of the housing or incorporated within a label that covers the housing. The magnetic diverter may be painted or coated on the surface of the housing. The magnetic diverter may be, for example, about 30 micrometers to about 300 micrometers thick.

Referring to FIG. 1, an indicator circuit 100 including an antenna 110, an integrated circuit (IC) 120, a ground plane 130, a system ground 132, and a decoupler component 140 is shown. The antenna 110 includes at least one antenna trace 150, a first antenna terminal 152, and a second antenna terminal 154. The first antenna terminal 152 and the second antenna terminal 154 of the antenna 110 are electrically coupled to the integrated circuit 120. The decoupler component 140 includes a first decoupler component terminal 142 and a second decoupler component terminal 144. The integrated circuit 120 is electrically coupled to the first decoupler component terminal 142 via the system ground 132. The second decoupler component terminal 144 is electrically connected to the ground plane 130. A parasitic capacitance 160 may form between the antenna 110 and the ground plane 130. The parasitic capacitance 160 may have a capacitive value that is schematically represented by a capacitor 162. The capacitive value of the parasitic capacitance 160 will vary depending upon the area of overlap of the antenna 110 with the ground plane 130. The capacitive value of the parasitic capacitance 160 will also vary depending upon the distance between the antenna 110 and the ground plane 130 as well as the dielectric medium between the antenna 110 and the ground plane 130. The integrated circuit current ($I_{IC}$); the antenna current ($I_{ANT}$); the current lost to the parasitic capacitance ($I_{LOST}$); and the antenna voltage ($V_{ANT}$) are also shown within FIG. 1 to further assist the exemplary calculations that are discussed above.

The parasitic capacitance 160 is shown in FIG. 1 as broken lines to indicate that the parasitic capacitance 162 is not a physical part of the circuitry of the indicator circuit 100. The decoupler component 140 decouples the parasitic capacitance 160 from the antenna 110 and reduces or eliminates any interference from the ground plane 130 with the antenna 110. The antenna voltage ($V_{ANT}$) of the antenna 110 within the indicator circuit 100 that is decoupled from the ground plane 130 may not be adversely affected by the parasitic capacitance 160 that may form between the antenna 110 and the ground plane 130.

Figure 2:
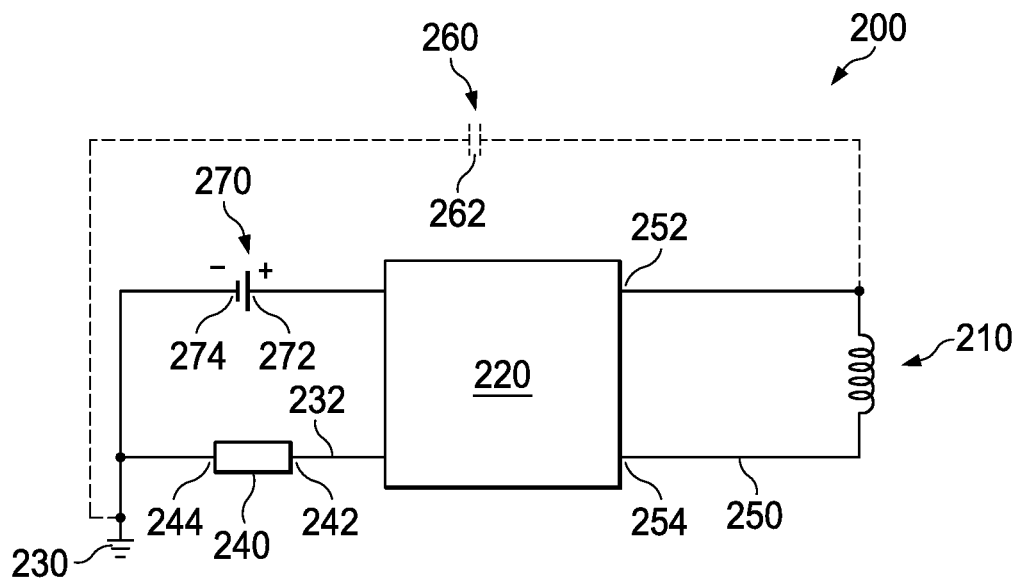
FIG. 2 is a schematic of another indicator circuit decoupled from a ground plane according to one or more embodiments shown and described herein.

Referring to FIG. 2, an indicator circuit 200 including an antenna 210, an integrated circuit (IC) 220, a ground plane 230, a system ground 232, and a decoupler component 240 that is connected to a battery 270 is shown. The antenna 210 includes at least one antenna trace 250, a first antenna terminal 252, and a second antenna terminal 254. The first antenna terminal 252 and the second antenna terminal 254 of the antenna 210 are electrically coupled to the integrated circuit 220. The battery 270 includes one electrochemical cell. The battery 270 includes a positive terminal 272 and a negative terminal 274. The integrated circuit 220 is electrically connected to the positive terminal 272 of the battery 270. The decoupler component 240 includes a first decoupler component terminal 242 and a second decoupler component terminal 244. The integrated circuit 220 is electrically coupled to the first decoupler component terminal 242 via the system ground 232. The second decoupler component terminal 244 is electrically connected to the negative terminal 274 of the battery 270. The negative terminal 274 of the battery 270 also acts as the ground plane 230. A parasitic capacitance 260 may form between the antenna 210 and the negative terminal 274/ground plane 230. The parasitic capacitance 260 may have a capacitive value that is schematically represented by a capacitor 262. The capacitive value of the parasitic capacitance 260 will vary depending upon the area of overlap of the antenna 210 with the negative terminal 274/ground plane 230. The capacitive value of the parasitic capacitance 260 will also vary depending upon the distance between the antenna 210 and the negative terminal 274/ground plane 230 as well as the dielectric medium between the antenna 210 and the negative terminal 274/ground plane 230.

The parasitic capacitance 260 is shown in FIG. 2 as broken lines to indicate that the parasitic capacitance 260 is not a physical part of the circuitry of the indicator circuit 200. The decoupler component 240 decouples the parasitic capacitance 260 from the antenna 210 and reduces or eliminates any interference from the negative terminal 274/ground plane 230 with the antenna 210. The antenna voltage of the antenna 210 within the indicator circuit 200 that is decoupled from the negative terminal 274/ground plane 230 may not be adversely affected by the parasitic capacitance 260 that may form between the antenna 210 and the negative terminal 274/ground plane 230.

Figure 3:
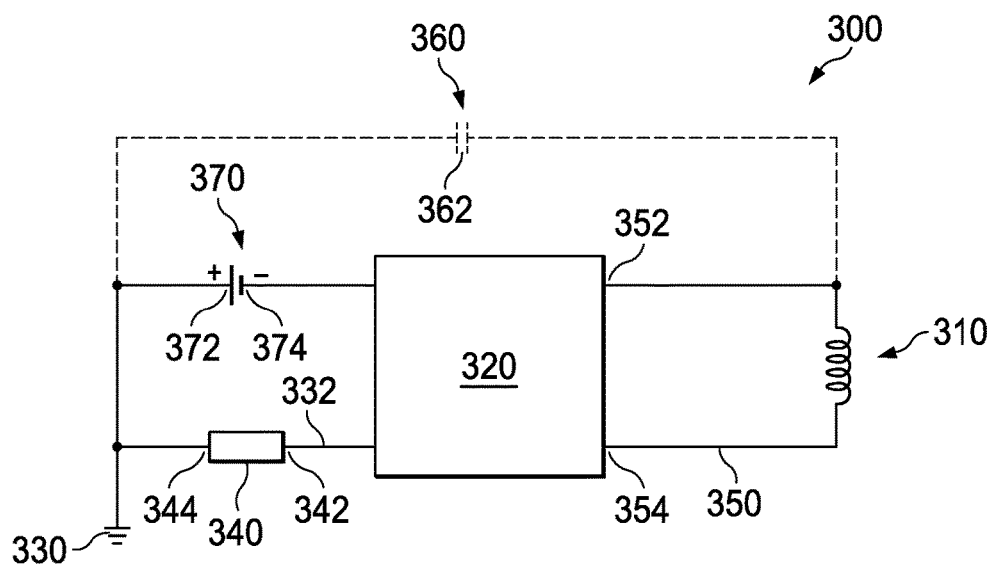
FIG. 3 is a schematic of another indicator circuit decoupled from a ground plane according to one or more embodiments shown and described herein.

Referring to FIG. 3, an indicator circuit 300 including an antenna 310, an integrated circuit (IC) 320, a ground plane 330, a system ground 332, and a decoupler component 340 that is connected to a battery 370 is shown. The antenna 310 includes at least one antenna trace 350, a first antenna terminal 352, and a second antenna terminal 354. The first antenna terminal 352 and the second antenna terminal 354 of the antenna 310 are electrically coupled to the integrated circuit 320. The battery 370 includes one electrochemical cell. The battery 370 includes a positive terminal 372 and a negative terminal 374. The integrated circuit 320 is electrically coupled to the negative terminal 374 of the battery 370. The decoupler component 340 includes a first decoupler component terminal 342 and a second decoupler component terminal 344. The integrated circuit 320 is electrically coupled to the first decoupler component terminal 342 via the system ground 332. The second decoupler component terminal 344 is electrically connected to the positive terminal 372 of the battery 370. The positive terminal 372 of the battery 370 also acts as the ground plane 330. A parasitic capacitance 360 may form between the antenna 310 and the positive terminal 372/ground plane 330.

The parasitic capacitance 360 may have a capacitive value that is schematically represented by a capacitor 362. The capacitive value of the parasitic capacitance 360 will vary depending upon the area of overlap of the antenna 310 with the positive terminal 372/ground plane 330. The capacitive value of the parasitic capacitance 360 will also vary depending upon the distance between the antenna 310 and the positive terminal 372/ground plane 330 as well as the dielectric medium between the antenna 310 and the positive terminal 372/ground plane 330. The parasitic capacitance 360 is shown in FIG. 3 as broken lines to indicate that the parasitic capacitance 360 is not a physical part of the circuitry of the indicator circuit 300. The decoupler component 340 decouples the parasitic capacitance 360 from the antenna 310 and reduces or eliminates any interference from the positive terminal 372/ground plane 330 with the antenna 310. The antenna voltage of the antenna 310 within the indicator circuit 300 that is decoupled from the positive terminal 372/ground plane 330 may not be adversely affected by the parasitic capacitance 360 that may form between the antenna 310 and the positive terminal 372/ground plane 330.

Figure 4:
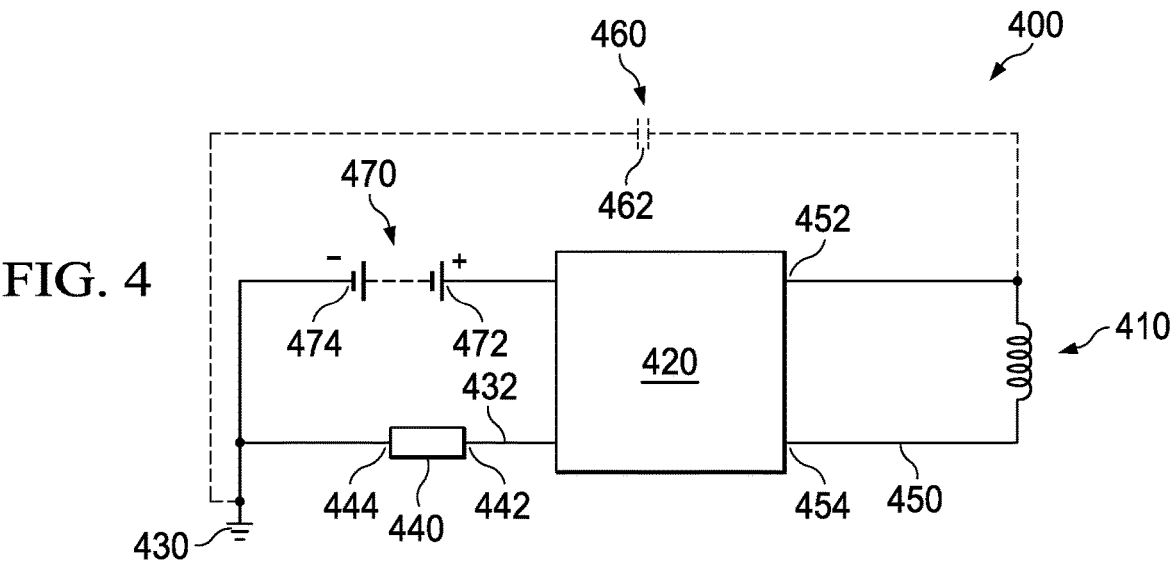
FIG. 4 is a schematic of another indicator circuit decoupled from a ground plane according to one or more embodiments shown and described herein.

Referring to FIG. 4, an indicator circuit 400 including an antenna 410, an integrated circuit (IC) 420, a ground plane 430, a system ground 432, and a decoupler component 440 that is connected to a battery 470 is shown. The antenna 410 includes at least one antenna trace 450, a first antenna terminal 452, and a second antenna terminal 454. The first antenna terminal 452 and the second antenna terminal 454 of the antenna 410 are electrically coupled to the integrated circuit 420. The battery 470 includes at least two electrochemical cells. The battery 470 includes a positive terminal 472 and a negative terminal 474. The IC 420 is electrically coupled with the positive terminal 472 of the battery 470. The decoupler component 440 includes a first decoupler component terminal 442 and a second decoupler component terminal 444. The integrated circuit 420 is electrically coupled to the first decoupler component terminal 442 via the system ground 432. The second decoupler component terminal 444 is electrically connected to the negative terminal 474 of the battery 470. The negative terminal 474 of the battery 470 also acts as the ground plane 430. A parasitic capacitance 460 may form between the antenna 410 and the negative terminal 474/ground plane 430. The parasitic capacitance 460 may have a capacitive value that is schematically represented by a capacitor 462. The capacitive value of the parasitic capacitance 460 will vary depending upon the area of overlap of the antenna 410 with the negative terminal 474/ground plane 430. The capacitive value of the parasitic capacitance 460 will also vary depending upon the distance between the antenna 410 and the negative terminal 474/ground plane 430 as well as the dielectric medium between antenna 410 and the negative terminal 474/ground plane 430.

The parasitic capacitance 460 may have a capacitive value that is schematically represented by a capacitor 462. The capacitive value of the parasitic capacitance 460 will vary depending upon the area of overlap of the antenna 410 with the negative terminal 474/ground plane 430. The capacitive value of the parasitic capacitance 460 will also vary depending upon the distance between the antenna 410 and the negative terminal 474/ground plane 430 as well as the dielectric medium between the antenna 410 and negative terminal 474/ground plane 430. The parasitic capacitance 460 is shown in FIG. 4 as broken lines to indicate that the parasitic capacitance 460 is not a physical part of the circuitry of the indicator circuit 400. The decoupler component 440 decouples the parasitic capacitance 460 from the antenna 410 and reduces or eliminates any interference from the negative terminal 474/ground plane 430 with the antenna 410. The antenna voltage of the antenna 410 within the indicator circuit 400 that is decoupled from the negative terminal 474/ground plane 430 may not be adversely affected by the parasitic capacitance 460 that may form between the antenna 410 and the negative terminal 474/ground plane 430.

Figure 5:
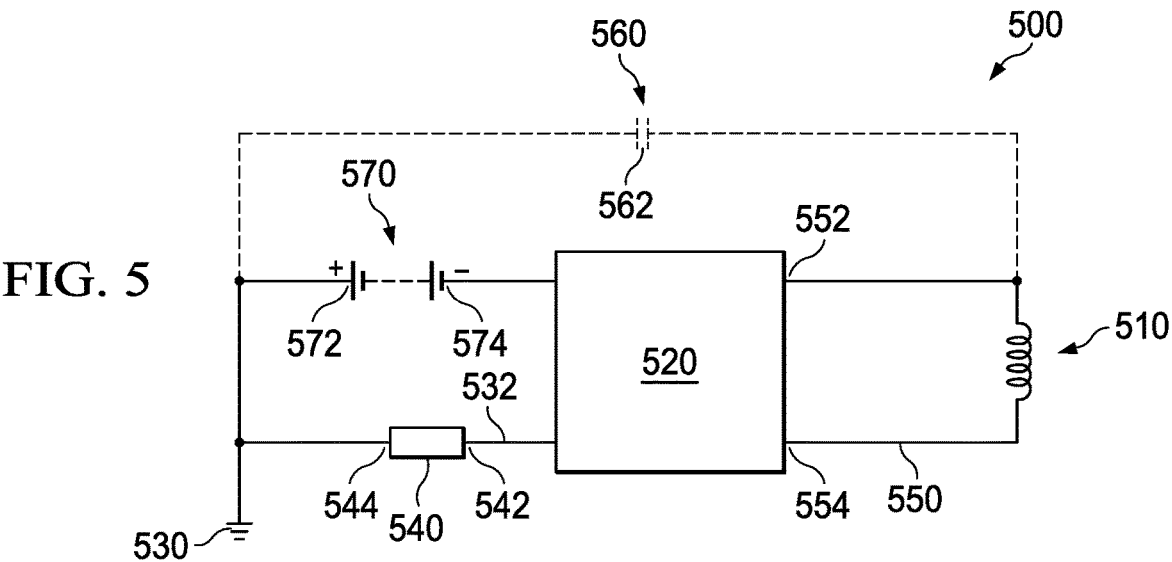
FIG. 5 is a schematic of another indicator circuit decoupled from a ground plane according to one or more embodiments shown and described herein.

Referring to FIG. 5, an indicator circuit 500 including an antenna 510, an integrated circuit (IC) 520, a ground plane 530, a system ground 532, and a decoupler component 540 that is connected to a battery 570 is shown. The antenna 510 includes at least one antenna trace 550, a first antenna terminal 552, and a second antenna terminal 554. The first antenna terminal 552 and the second antenna terminal 554 of the antenna 510 are electrically coupled to the integrated circuit 520. The battery 570 includes at least two electrochemical cells. The battery 570 includes a positive terminal 572 and a negative terminal 574. The IC 520 is electrically coupled to the negative terminal 574 of the battery 570. The decoupler component 540 includes a first decoupler component terminal 542 and a second decoupler component terminal 544. The integrated circuit 520 is electrically coupled to the first decoupler component terminal 542 via the system ground 532. The second decoupler component terminal 544 is electrically connected to the positive terminal 572 of the battery 570. The positive terminal 572 of the battery 570 also acts as the ground plane 530. A parasitic capacitance 560 may form between the antenna 510 and the positive terminal 572/ground plane 530.

The parasitic capacitance 560 may have a capacitive value that is schematically represented by a capacitor 562. The capacitive value of the parasitic capacitance 560 will vary depending upon the area of overlap of the antenna 510 with the positive terminal 572/ground plane 530. The capacitive value of the parasitic capacitance 560 will also vary depending upon the distance between the antenna 510 and the positive terminal 572/ground plane 530 as well as the dielectric medium between the antenna 510 and the positive terminal 572/ground plane 530. The parasitic capacitance 560 is shown is FIG. 5 as broken lines to indicate that the parasitic capacitance 560 is not a physical part of the circuitry of the indicator circuit 500. The decoupler component 540 decouples the parasitic capacitance 560 from the antenna 510 and reduces or eliminates any interference from the positive terminal 572/ground plane 530 with the antenna 510. The antenna voltage of the antenna 510 within the indicator circuit 500 that is decoupled from the positive terminal 572/ground plane 530 may not be adversely affected by the parasitic capacitance 560 that may form between the antenna 510 and the positive terminal 572/ground plane 530.

Figure 6:
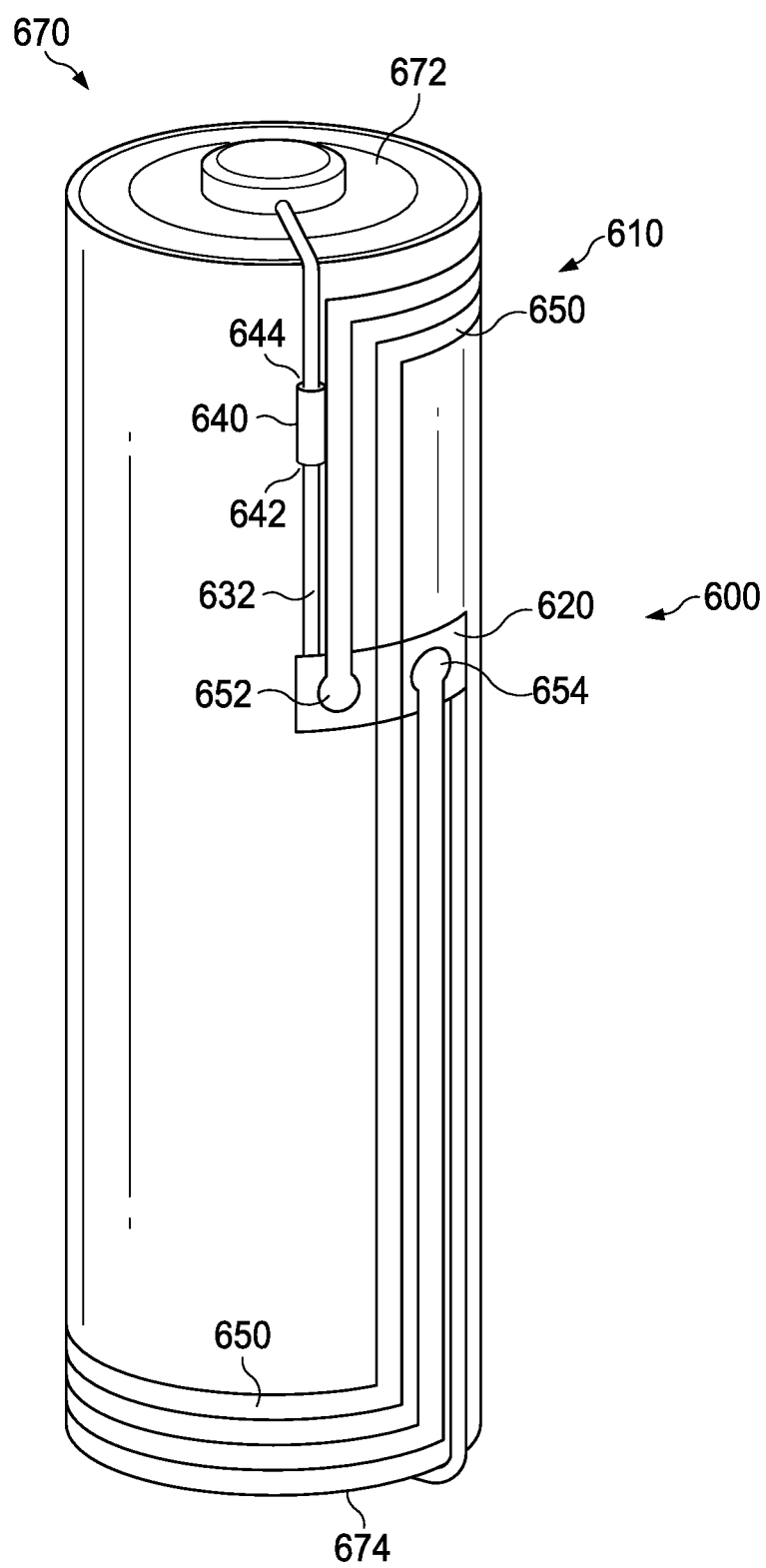
FIG. 6 is an antenna on a cylindrical battery including an indicator circuit according to one or more embodiments shown and described herein.

Referring to FIG. 6, an indicator circuit 600 including an antenna 610, an integrated circuit (IC) 620, a system ground 632, and a decoupler component 640 that is connected to a cylindrical battery 670 is shown. The antenna 610 includes at least one antenna trace 650, a first antenna terminal 652, and a second antenna terminal 654. The first antenna terminal 652 and the second antenna terminal 654 of the antenna 610 are electrically coupled to the integrated circuit 620. The battery 670 includes a positive terminal 672 and a negative terminal 674. The integrated circuit 620 is electrically coupled to the negative terminal 674 of the battery 670. The decoupler component 640 includes a first decoupler component terminal 642 and a second decoupler component terminal 644. The integrated circuit 620 is electrically coupled to the first decoupler component terminal 642 via the system ground 632. The second decoupler component terminal 644 is electrically connected to the positive terminal 672 of the battery 670. The positive terminal 672 of the battery 670 also acts as a ground plane. A parasitic capacitance may form between the antenna 610 and the positive terminal 672 of the battery 670. The decoupler component 640 decouples the parasitic capacitance from the antenna 610 and reduces or eliminates any interference from the positive terminal 672 with the antenna 610. The antenna voltage of the antenna 610 within the indicator circuit 600 that is decoupled from the positive terminal 672/ground plane may not be adversely affected by the parasitic capacitance that may form between the antenna 610 and the positive terminal 672/ground plane.

Figure 7:
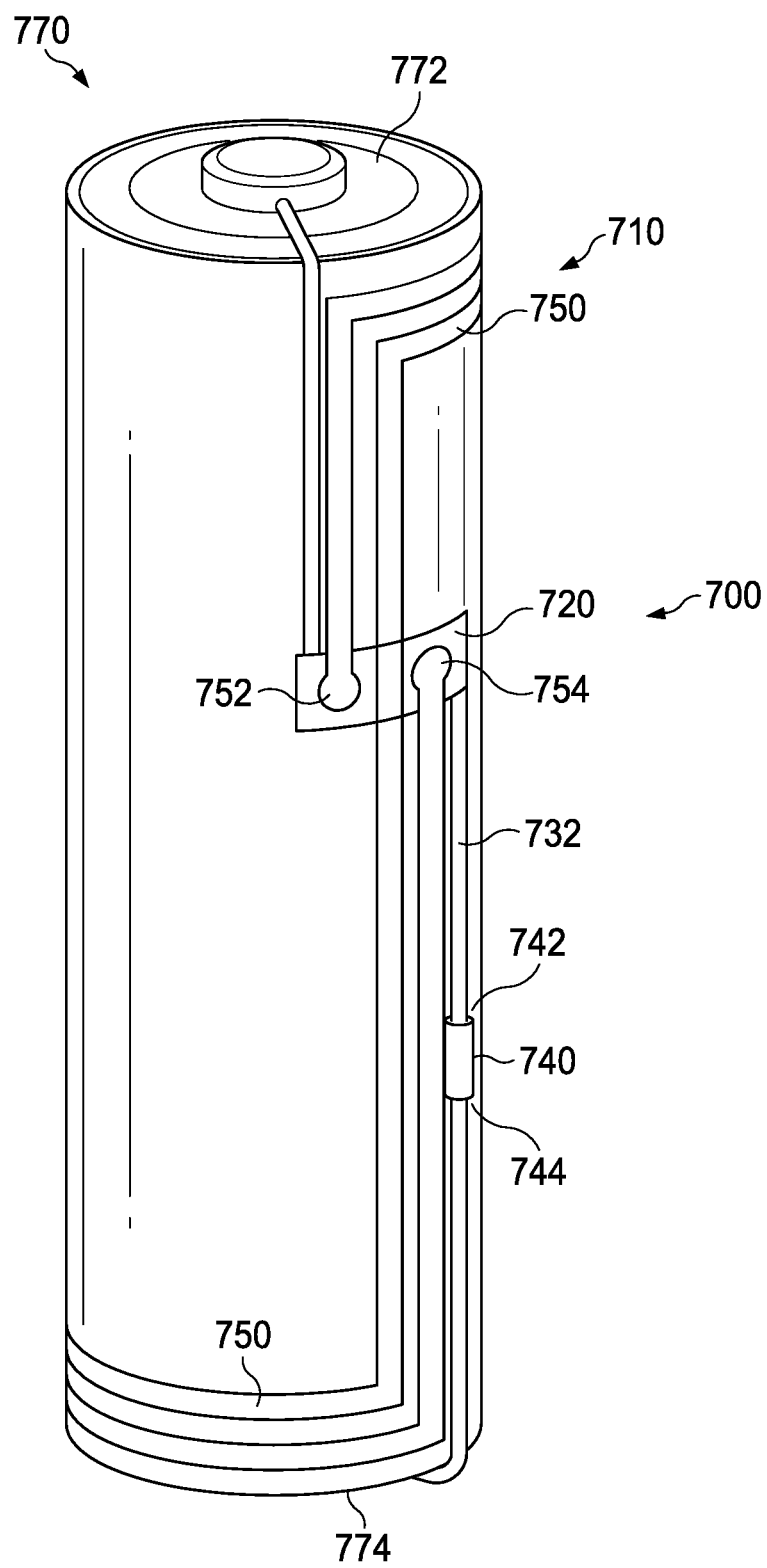
FIG. 7 is another antenna on a cylindrical battery including an indicator circuit according to one or more embodiments shown and described herein.

Referring to FIG. 7, an indicator circuit 700 including an antenna 710, an integrated circuit (IC) 720, a system ground 732, and a decoupler component 740 that is connected to a cylindrical battery 770 is shown. The antenna 710 includes at least one antenna trace 750, a first antenna terminal 752, and a second antenna terminal 754. The first antenna terminal 752 and the second antenna terminal 754 of the antenna 710 are electrically coupled to the integrated circuit 720. The battery 770 includes a positive terminal 772 and a negative terminal 774. The integrated circuit 720 is electrically coupled to the positive terminal 772 of the battery 770. The decoupler component 740 includes a first decoupler component terminal 742 and a second decoupler component terminal 744. The integrated circuit 720 is electrically coupled to the first decoupler component terminal 742 via the system ground 732. The second decoupler component terminal 744 is electrically connected to the negative terminal 774 of the battery 770. The negative terminal 774 of the battery 770 also acts as a ground plane. A parasitic capacitance may form between the antenna 710 and the negative terminal 774 of the battery 770. The decoupler component 740 decouples the parasitic capacitance from the antenna 710 and reduces or eliminates any interference from the negative terminal 774 with the antenna 710. The antenna voltage of the antenna 710 within the indicator circuit 700 that is decoupled from the negative terminal 774/ground plane may not be adversely affected by the parasitic capacitance that may form between the antenna 710 and the negative terminal 774/ground plane.

Figure 8:
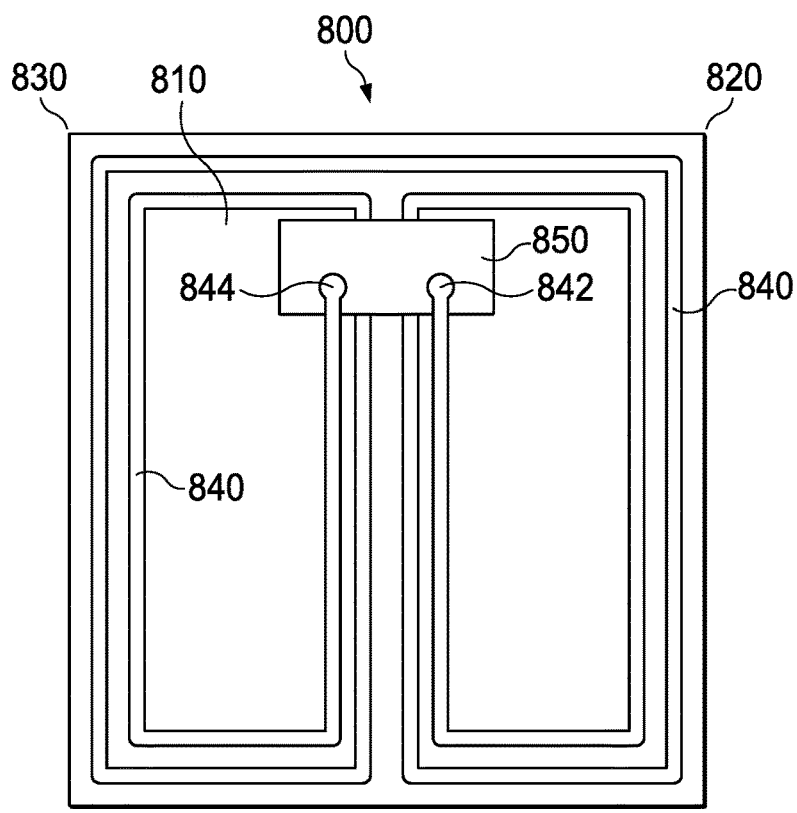
FIG. 8 is an out-of-phase configuration of a two symmetrical loop antenna that may be used in combination with an indicator circuit according to one or more embodiments shown and described herein.

Referring to FIG. 8, an out-of-phase configuration of a two symmetrical loop antenna 800 is shown. FIG. 8 depicts the two symmetrical loop antenna 800 flat for clarity of the non-overlapping two symmetrical loops. The two symmetrical loop antenna 800 may be printed on a flexible substrate 810. The flexible substrate 810 may have a first edge 820 and a second edge 830. Each symmetrical loop of the two symmetrical loop antenna 800 may include one, two, or more turns of an antenna trace 840. The antenna 800 may include a first antenna terminal 842 and a second antenna terminal 844. The first antenna terminal 842 and the second antenna terminal 844 may be electrically coupled to an integrated circuit (IC) 850. The antenna 800 may be included within an indicator circuit that is decoupled from a ground plane for use within a wireless communication system.

Figure 9:
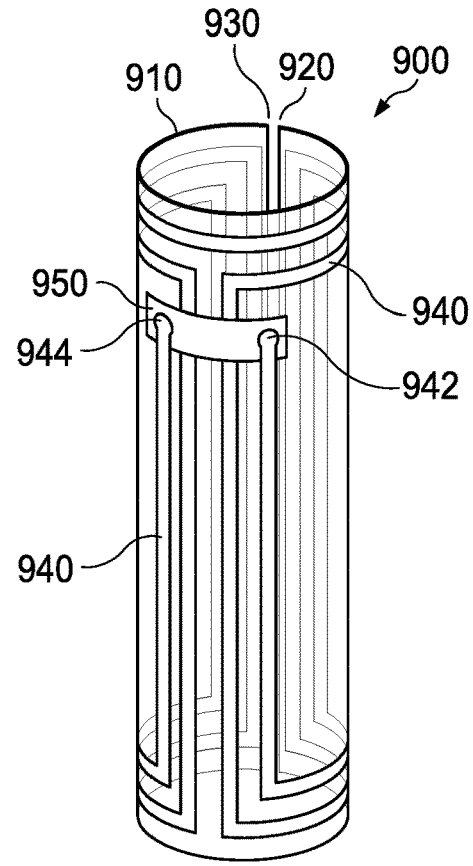
FIG. 9 is another out-of-phase configuration of a two symmetrical loop antenna that may be used in combination with an indicator circuit according to one or more embodiments shown and described herein.

Referring to FIG. 9, an out-of-phase configuration of a two symmetrical loop antenna 900 (as shown in FIG. 8) on a flexible 910 that may be wrapped around a cylindrical body, such as a battery, is shown. There is no overlap between the first edge 920 and the second edge 930. The IC 950, the first antenna terminal 942, and the second antenna terminal 944 are shown and work as described above. In this illustrative embodiment, when the flexible substrate 910 is wrapped around a cylindrical object, the first edge 920 and the second edge 930 are substantially parallel to each other. In another embodiment, the two symmetrical loop antenna may be printed on the flexible substrate 910 that is cylindrical in shape. The cylindrical shaped flexible substrate 910 may slide over the cylindrical body. The antenna 900 may be included within an indicator circuit that is decoupled from a ground plane, such as a cylindrical battery, for use within a wireless communication system, such as an on-cell remote indication system.

Figure 10:
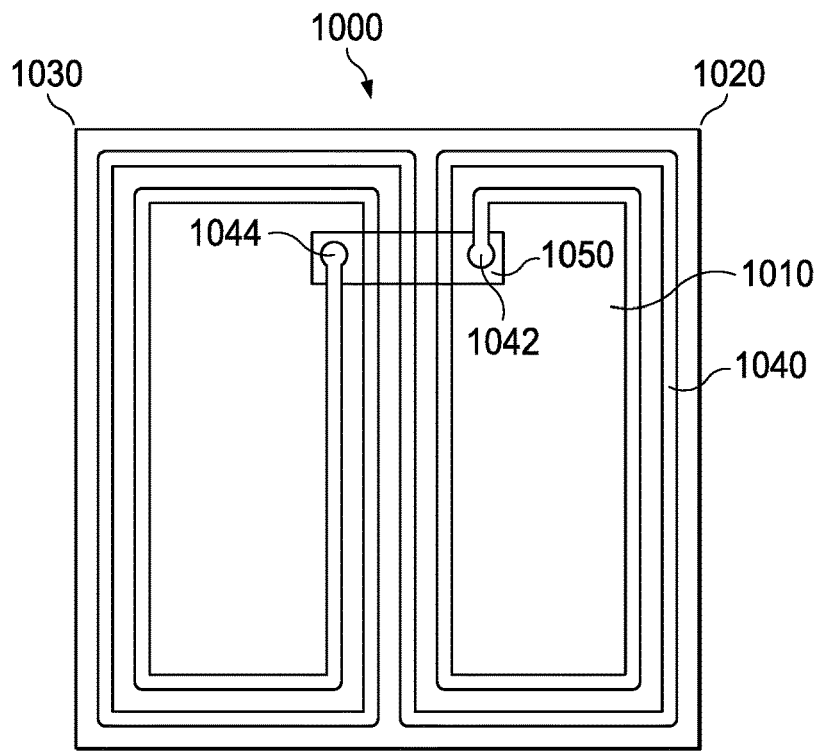
FIG. 10 is an in-phase configuration of a two symmetrical loop antenna that may be used in combination with an indicator circuit according to one or more embodiments shown and described herein.

Referring to FIG. 10, an in-phase configuration of a two symmetrical loop antenna 1000 is shown. FIG. 10 depicts the two symmetrical loop antenna 1000 flat for clarity of the non-overlapping two symmetrical loops. The two symmetrical loop antenna 1000 may be printed on a flexible substrate 1010. The flexible substrate 1010 may have a first edge 1020 and a second edge 1030. Each symmetrical loop of the two symmetrical loop antenna 1000 may include one, two, or more turns of an antenna trace 1040. The antenna 1000 may include a first antenna terminal 1042 and a second antenna terminal 1044. The first antenna terminal 1042 and the second antenna terminal 1044 may be electrically coupled to an integrated circuit (IC) 1050. In the in-phase configuration 1000, the antenna trace 1040 connections with the IC 1050 are reversed as shown in the out-of-phase connection of FIGS. 8 and 9. The antenna 1000 may be included within an indicator circuit that is decoupled from a ground plane for use within a wireless communication system.

Figure 11:
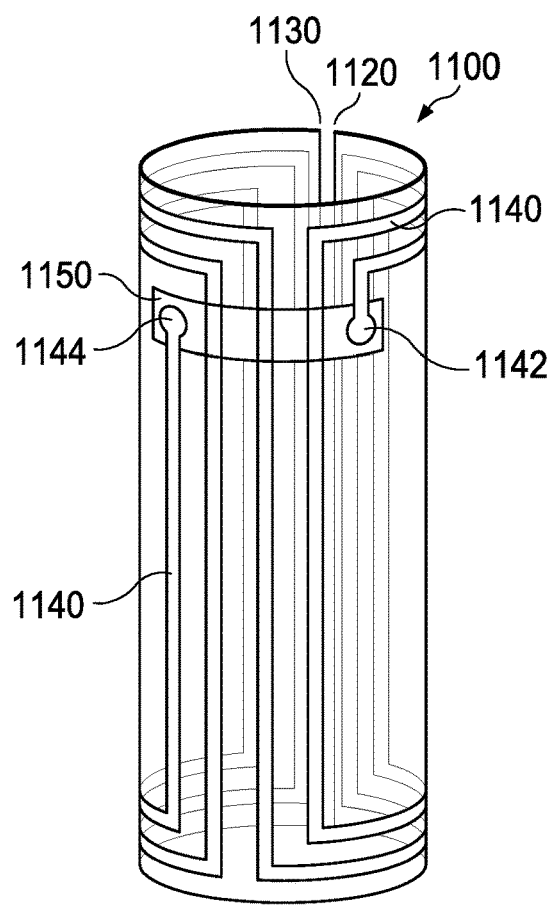
FIG. 11 is another in-phase configuration of a two symmetrical loop antenna that may be used in combination with an indicator circuit according to one or more embodiments shown and described herein.

Referring to FIG. 11, an in-phase configuration of a two symmetrical loop antenna 1100 (as shown in FIG. 10) on a flexible 1110 that may be wrapped around a cylindrical body, such as a battery, is shown. There is no overlap between the first edge 1120 and the second edge 1130. The IC 1150, the first antenna terminal 1142, and the second antenna terminal 1144 are shown and work as described above. In this illustrative embodiment, when the flexible substrate 1110 is wrapped around a cylindrical object, the first edge 1120 and the second edge 1130 are substantially parallel to each other. In another embodiment, the two symmetrical loop antenna 1100 may be printed on the flexible substrate 1110 that is cylindrical in shape. The cylindrical shaped flexible substrate 1110 may slide over the cylindrical body. The antenna 1100 may be included within an indicator circuit that is decoupled from a ground plane, such as a cylindrical battery, for use within a wireless communication system, such as an on-cell remote indication system.

The two symmetrical loop antenna is shown in an out-of-phase configuration (FIGS. 8 and 9) and in the in-phase configuration (FIGS. 10 and 11). When the two symmetrical loop antenna is coupled to the cylindrical body, such as the cylindrical battery, the two loops of the two symmetrical loop antenna are at about 180 degrees apart (opposite sides of the cylindrical body) from each other which may allow for better signal communication between the two symmetrical loop antenna and a reader. The out-of-phase configuration provides for increased signal fidelity at the cylindrical ends (top and bottom) of the cylindrical body where the circular sections of the antenna trace along a top section and a bottom section of the cylindrical body are in phase with one another and the long axis sections of the antenna trace cancel out. The term "in phase" may include situations where a wave form is in sync or where the frequency of two or more waveforms are the same and their positive and negative peaks occur at the same time. The term "cancel out" may include situations where two or more waveforms are out-of-phase by about 180 degrees and have the same frequency and amplitude.

In some embodiments, the flexible substrate may be a multi-layer printed circuit board (PCB). The first terminal may be electrically coupled to the IC on the chip location via a different layer on the multi-layered PCB than the antenna trace. This may allow the overlap of traces as shown in FIGS. 9 and 11 without electrically coupling the traces together. Furthermore, the leads to the positive terminal and negative terminal of the battery as shown in FIGS. 6 and 7 may also be on a separate layer of the multi-layered PCB to facilitate the crossing of the leads with the antenna trace.

Experimental Testing

An exemplary AA battery with an indicator circuit is assembled. The battery is a nickel metal hydride rechargeable battery with a metal housing. The battery includes a positive terminal and a negative terminal. A layer of thin, ferrite material covers the surface of the cylindrical axis of the metal housing of the battery. A flexible antenna is tightly wrapped around the cylindrical axis of the ferrite-covered metal housing. A passive, ISO15693 RFID-enabled silicon chip with on-board analog-to-digital converter (ADC) is electrically connected to the antenna. A tuning capacitor to closely match the resonant frequency of the antenna to that of the RFID reader (13.56 MHz) is electrically connected to the integrated circuit. A voltage divider consisting of a 680 k$\Omega$ resistor and a 360 k$\Omega$ resistor is connected between the positive terminal of the battery and a system ground. The output of the voltage divider is connected to the ADC input of the IC.

Battery A includes an indicator circuit where the ADC input is connected to the positive terminal of the battery through a voltage divider. The system ground of the IC of the indicator circuit for Battery A is not connected to, or in proximity with, a ground plane. Battery B includes an indicator circuit where the ADC input is connected to the positive terminal of the battery through a voltage divider. The system ground of the IC of the indicator circuit for Battery B is connected to the metal housing of the battery through a decoupler component that is a 20 k$\Omega$ resistor. Battery C includes an indicator circuit where the ADC input is connected to the positive terminal of the battery through a voltage divider. The system ground of the IC of the indicator circuit for Battery C is directly connected to the metal housing of the battery.

The read range of each indicator circuit within the exemplary battery is evaluated by the Read Range Test. The Read Range Test includes communicating, via a smartphone, with the RFID-enabled integrated circuit that is attached to the antenna within the indicator circuit that is in electrical communication with the battery. The maximum read range is found by aligning the long axes, center points, and relative rotation of the smartphone and the battery. The maximum read range for each configuration is recorded with the use of an NFC enabled application on the smartphone. The maximum read range is determined by measuring the furthest distance at which successful communication is established between the smartphone and the indicator circuit. To measure the maximum read range, the indicator circuit and phone are separated by a set distance by using a non-metallic spacer of low permittivity. The smartphone attempts to initiate communication with the indicator circuit. Successful communication is deemed to have occurred if the phone is able to receive and understand the indicator circuit's response containing its Unique Identification Number (UID) and voltage reading. The distance between the phone and antenna is successively increased until communication is no longer established. The distance measured is that between the rear surface of the phone and the closest surface of the antenna to the phone. The Read Range Test is carried out in a laboratory at room temperature.

The maximum read range of Battery A is determined to be 28.0 mm. The maximum read range of Battery C is determined to be 9 mm, or about 32% of the maximum read range of Battery A. The maximum read range of Battery B is determined to be 27.7 mm, or about 99% of the maximum read range of Battery A. The read range of Battery B, which includes an indicator circuit that includes a decoupler component of the present invention, has a read range that is approximately equal to Battery A and does not exhibit a significant reduction in read range in the presence of the metal housing (ground plane) of the battery. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An indicator circuit configured to be wrapped around a cylindrical body, wherein the cylindrical body is a battery, comprising:
   a two symmetrical loop antenna, the two symmetrical loop antenna comprising at least one antenna trace, a first antenna terminal, and a second antenna terminal, wherein the antenna is wrapped around the cylindrical body;
   a decoupler component, the decoupler component comprising a first decoupler component terminal and a second decoupler component terminal; and
   an integrated circuit;
   wherein the integrated circuit is electrically coupled to the first antenna terminal and the second antenna terminal; the integrated circuit is electrically coupled to the first decoupler component terminal; and the second decoupler component terminal is electrically connected to a metal body.

2. The indicator circuit of claim 1, wherein the decoupler component is selected from the group consisting of a resistor, an inductor, and any combination thereof.

3. The indicator circuit of claim 1, wherein the metal body is a ground plane, a positive terminal of the battery, or a negative terminal of the battery.

4. The indicator circuit of claim 3, wherein the metal body is the ground plane.

5. The indicator circuit of claim 3, wherein the metal body is the positive terminal of the battery.

6. The indicator circuit of claim 3, wherein the metal body is the negative terminal of the battery.

7. An indicator circuit comprising:
   a cylindrical battery, the battery comprising a positive terminal and a negative terminal;
   a two symmetrical loop antenna that is in-phase, the antenna comprising at least one antenna trace, a first antenna terminal, and a second antenna terminal, wherein the antenna is wrapped around the battery;
   a decoupler component, the decoupler component comprising a first decoupler component terminal and a second decoupler component terminal; and
   an integrated circuit;
   wherein the integrated circuit is electrically coupled to the first antenna terminal and the second antenna terminal; the integrated circuit is electrically coupled to the positive terminal of the battery; the integrated circuit is electrically coupled to the first decoupler component terminal; and the second decoupler component terminal is electrically connected to the negative terminal of the battery.

8. The indicator circuit of claim 7, wherein the decoupler component is selected from the group consisting of a resistor, an inductor, and any combination thereof.

9. The indicator circuit of claim 7, wherein the integrated circuit comprises an analog to digital converter and a communication circuit and wherein the integrated circuit is configured to sense a condition of the cylindrical battery and signally communicate the condition to a reader.

10. The indicator circuit of claim 9, wherein the condition of the cylindrical battery is chosen from the group consisting of over-discharge protection, over-charge protection, remaining capacity determination, voltage determination, cycle life determination, and power management.

11. The indicator circuit of claim 7, wherein the integrated circuit further comprises a radio frequency identification chip or a near field communication chip.

12. The indicator circuit of claim 7, wherein the cylindrical battery comprises a metal housing.

13. An indicator circuit comprising:
   a cylindrical battery, the cylindrical battery comprising a positive terminal and a negative terminal;
   a two symmetrical loop antenna, the antenna comprising at least one antenna trace, a first antenna terminal, and a second antenna terminal, wherein the antenna is wrapped around the cylindrical battery;
   a decoupler component, the decoupler component comprising a first decoupler component terminal and a second decoupler component terminal; and
   an integrated circuit;
   wherein the integrated circuit is electrically coupled to the first antenna terminal and the second antenna terminal; the integrated circuit is electrically coupled to the negative terminal of the battery; the integrated circuit is electrically coupled to the first decoupler component terminal; and the second decoupler component terminal is electrically coupled to the positive terminal of the battery.

14. The indicator circuit of claim 13, wherein the decoupler component is selected from the group consisting of a resistor, an inductor, and any combination thereof.

15. The indicator circuit of claim 13, wherein the integrated circuit comprises an analog to digital converter and a communication circuit and wherein the integrated circuit is configured to sense a condition of the battery and signally communicate the condition to a reader.

16. The indicator circuit of claim 15, wherein the condition of the battery is chosen from the group consisting of over-discharge protection, over-charge protection, remaining capacity determination, voltage determination, cycle life determination, and power management.

17. The indicator circuit of claim 13, wherein the integrated circuit further comprises a radio frequency identification chip or a near field communication chip.

18. The indicator circuit of claim 13, wherein the two loops of the two symmetrical loop antenna are in an in-phase configuration.

19. The indicator circuit of claim 13, wherein the antenna is a two symmetrical loop antenna that is out-of-phase.

20. The indicator circuit of claim 13, wherein the cylindrical battery comprises a metal housing.

\* \* \* \* \*